(12) United States Patent
Yssa et al.

(10) Patent No.: US 11,089,165 B2
(45) Date of Patent: Aug. 10, 2021

(54) RETROFITABLE INTERNET-ENABLED ACCESS CONTROL SYSTEM AND METHOD

(71) Applicant: Charles AbouSaid Yssa, Matn (LB)

(72) Inventors: Charles AbouSaid Yssa, Matn (LB); Alexandre AbouSaid Yssa, Matn (LB); Hady Abdel Nour, Dekwaneh (LB); Elias Bachaalany, Halat (LB); Imad Maalouf, Matn (LB)

( * ) Notice: Subject to any disclaimer, the term of this patent is extended or adjusted under 35 U.S.C. 154(b) by 43 days.

(21) Appl. No.: 16/552,044

(22) Filed: Aug. 27, 2019

(65) Prior Publication Data

US 2019/0387104 A1 Dec. 19, 2019

Related U.S. Application Data

(60) Provisional application No. 62/765,566, filed on Aug. 31, 2018.

(51) Int. Cl.
*H04M 11/02* (2006.01)
*G07C 9/00* (2020.01)

(52) U.S. Cl.
CPC ....... *H04M 11/025* (2013.01); *G07C 9/00309* (2013.01); *G07C 2009/00507* (2013.01)

(58) Field of Classification Search
CPC .... H04M 11/025; H04M 11/00; H04M 11/02; H04M 1/0291; G07C 9/00309; G07C 9/00682; G07C 2009/00507; G07C 9/00944; G07C 2009/00634
See application file for complete search history.

(56) References Cited

U.S. PATENT DOCUMENTS

| 3,284,571 A | 11/1966 | Wittig |
| 3,484,571 A | 12/1969 | Matthews |
| 3,665,116 A | 5/1972 | Holstrom |

(Continued)

FOREIGN PATENT DOCUMENTS

| DE | 10127029 | 10/2002 |
| DE | 102004059224 | 6/2006 |

(Continued)

OTHER PUBLICATIONS

Bell System 500 Series Intercom Handset Data Sheet downloaded from www.intercomsrus.com on Aug. 25, 2019.

(Continued)

*Primary Examiner* — Adnan Aziz

(57) ABSTRACT

A communication device, system, and method configured for retrofitting into an existing dwelling unit intercom handset in an existing hard-wired building access system can be used to convert the existing building access system to one that is internet connected for remotely unlocking a door, gate, and/or similar. The communication device can be powered by drawing a small and controlled amount of current from the source that powers the unlock coil for the existing hard-wired building access system. The communication device can be configured to receive and transmit a ringer signal over the internet. The communication device can be configured to transmit an unlock signal to the lock deactivation module of the existing hard-wire building access system in response to information received from the internet and/or the ringer signal.

19 Claims, 17 Drawing Sheets

(56) References Cited

U.S. PATENT DOCUMENTS

| | | | | |
|---|---|---|---|---|
| 4,023,139 A * | 5/1977 | Samburg | B66B 5/0006 | 340/506 |
| 5,440,644 A * | 8/1995 | Farinelli | H04M 1/723 | 381/81 |
| 5,784,446 A * | 7/1998 | Stuart | H04M 11/025 | 379/159 |
| 6,185,294 B1 * | 2/2001 | Chornenky | H04M 9/001 | 379/169 |
| 7,113,578 B2 * | 9/2006 | Unger | H04M 1/0291 | 379/167.01 |
| 8,594,314 B2 * | 11/2013 | Kitchin | H02J 4/00 | 379/324 |
| 8,621,245 B2 | 12/2013 | Shearer et al. | | |
| 8,947,530 B1 * | 2/2015 | Scalisi | H04M 11/025 | 348/143 |
| 9,871,399 B2 | 1/2018 | Mittleman et al. | | |
| 10,070,058 B2 * | 9/2018 | Siminoff | H04N 7/186 | |
| 2002/0003873 A1 * | 1/2002 | Rabenko | H04M 19/08 | 379/413 |
| 2006/0017547 A1 * | 1/2006 | Buckingham | H04L 12/2803 | 340/328 |
| 2008/0297339 A1 * | 12/2008 | Mathews | H04L 12/10 | 340/538.16 |
| 2009/0103704 A1 * | 4/2009 | Kitada | H04R 9/06 | 379/167.14 |
| 2010/0260247 A1 * | 10/2010 | Albiston | H04B 3/548 | 375/222 |
| 2012/0249290 A1 * | 10/2012 | Marsh | H04M 11/02 | 340/5.7 |
| 2013/0017812 A1 | 1/2013 | Foster | | |
| 2013/0051404 A1 * | 2/2013 | Binder | H04L 5/06 | 370/467 |
| 2015/0159895 A1 | 6/2015 | Quam et al. | | |
| 2015/0179011 A1 | 6/2015 | Kramer et al. | | |
| 2015/0341603 A1 * | 11/2015 | Kasmir | H04M 1/0291 | 348/143 |
| 2017/0061716 A1 * | 3/2017 | Davis | G07C 9/00174 | |
| 2017/0134152 A1 * | 5/2017 | Yamamoto | H04L 5/14 | |
| 2017/0223807 A1 | 8/2017 | Recker et al. | | |
| 2018/0040183 A1 * | 2/2018 | Cheng | G07C 9/00309 | |
| 2019/0056131 A1 * | 2/2019 | Warren | F24F 11/88 | |
| 2019/0066413 A1 * | 2/2019 | McLeod | G07C 9/27 | |

FOREIGN PATENT DOCUMENTS

| | | |
|---|---|---|
| DE | 102015210025 | 12/2016 |
| EP | 0064640 | 4/1982 |
| EP | 2506548 | 10/2012 |
| EP | 2698976 | 2/2014 |
| GB | 2489509 | 10/2012 |

OTHER PUBLICATIONS

Doorbell Buzzer Hack for Keyless Entry downloaded from www.mouseextinction.com on Aug. 25, 2019.

Smartphone-based Keyless Entry for Door Buzzers downloaded from www.mouseextinction.com on Aug. 25, 2019.

* cited by examiner

# RETROFITABLE INTERNET-ENABLED ACCESS CONTROL SYSTEM AND METHOD

CROSS REFERENCE TO RELATED APPLICATIONS

This patent application takes priority from US provisional patent application Ser. No. 62/765,566 filed 31 Aug. 2018. This patent application is also a continuation-in-part of PCT/GB2017/053753 filed 14 Dec. 2017, which takes priority from GB201621293A (also identified as GB1621293.8) filed 14 Dec. 2016. The entire disclosures of all aforementioned patent applications are incorporated by reference herein.

FIELD OF INVENTION

Embodiments of the invention(s) disclosed herein relate to systems and methods for access control. One such embodiment can comprise a communication module configured for retrofitting to an existing intercom lock system for lockable access control of a building. The communication module could be configured for installation in a single intercom in a single unit of such a building for controlling access to this building via this individual intercom. In another embodiment, the communication module could be a centralized add-on device to transform all intercoms in a building to smart intercoms. In embodiments of the invention(s), the communication module could be configured for wireless connection to the internet through a WiFi modem and/or through a cellular phone connection. The communication module could comprise other communication functionality such as Bluetooth. Embodiments of the lockable access control systems/methods can comprise autonomous unlocking functionality based on an input code, voice communication functionality, the ability to remotely unlock a fixed or movable storage container from a secure fixed base, and the ability to remotely unlock a fixed or movable storage container, such as a mailbox or storage unit in order to access the contents of the storage container.

BACKGROUND

Many multi-occupant buildings, building complexes, parking facilities, storage facilities, and similar access-controlled facilities provide access control by having a door or gate, or similar at the periphery of the access-controlled facility. The door, or gate, or similar peripheral access control device could be a lock (i.e. a peripheral lock) that connects to an intercom located in each unit of the building or building complex. The peripheral lock in such as system can typically be remotely unlocked by an occupant of a building unit when called through the intercom. Typically, a visitor at the locked door (or similar) will press a button on an intercom panel that will activate an audio notification (ringer or buzzer) in the building unit. If the occupant is in, he/she will typically hear the ringer/buzzer, talk with the visitor through the intercom, and then press a button on the intercom to send a signal to the door strike located at the peripheral lock. Typically, pressing this unlock button activates a solenoid or similar device, which allows the door (or similar) to be opened without turning a door latch. Such remote intercom-controlled systems typically use low-voltage and low-power circuitry to activate the solenoid or similar actuator in the electric door strike and to power the ringer/buzzer and intercom. This scenario and system can also be found in office buildings in which a plurality of companies each occupy a particular or room or rooms in the building. Such intercom-based remote unlocking system can be found in many other situations and applications. It can be understood that such systems could also be used to unlock a remote mailbox or storage unit. It can be understood that such systems could also be used for access control that does not involve a lock, such as an access control gate for a parking facility.

One significant limitation of such typical access control systems and methods is that they require a building occupant to be near the remote intercom unit (at home, etc.) in order to grant access. Explicit identification of the visitor by the building occupant, by means of the buzzer/ringer, voice intercom, and door strike actuation protocol can provide for a high level of security. In some cases, it may be desirable for a visitor to be permitted access to the location even when no building occupant is present, such as when a postal worker wishes to securely deliver a parcel. The intercom system as stated above is unable to resolve this type of scenario. One solution would be to provide a concierge service to enable visitor access, but this introduces security flaw, since the concierge service will not necessarily be certain of the identity of the visitor. Furthermore, such concierge services introduce an additional cost which will typically be borne out by the occupant of the residence.

Another possible solution to this access control problem would be to replace the intercom system with a more sophisticated system, such as a keycard access system, or a system in which a numerical keypad and associated entry code are provided for a visitor. Although this can partially overcome the stated drawbacks, these systems are typically more complicated and more costly than existing intercom access control systems and more difficult to retrofit into an existing building. Such adaptations cannot be easily implemented for a single residence of a multi-unit building but must instead be installed for the building as a whole, preventing a single building unit owner from upgrading without obtaining permission from others. Finally, and with particular reference to a numerical keypad solution, such systems can be subject to 'shoulder-surfing,' where a further external user separate from the intended visitor watches the visitor input their code, thereby nullifying the security of the code.

Mobile phones are now common and can be used for voice communication regardless of the location of the visitor and the unit owner. The internet can be used to electronically connect together more and more "things" (i.e. the "internet of things" or IoT). It is therefore desirable to provide a simple and low cost retrofit or enhancement to an existing access control system that can overcome the limitations described above and deliver one or more of the following capabilities:

(a) Provide the ability for a visitor to request access from a unit owner or occupant, and the unit owner/occupant to grant this access in real time, when there's no one in the residence or office;

(b) Provide a means for providing temporary access that uses a temporary code that can be assigned on a real-time basis, for a limited time period, an/or can be used once only;

(c) Provide these capabilities on a building unit-by-unit basis as a retrofit to an existing intercom in a residence or office without requiring the replacement or upgrading of the entire access control system for the building;

(d) Make this retrofit as simple as possible to install by working with the existing low-voltage and low power circuitry used by the existing intercom-based access control system;

(e) Use such capabilities for access control that does not involve a lock, such as the gate to a parking facility; and/or (f) Use a similar approach or technology for providing access to other lockable items, such a mail boxes, storage lockers, and movable containers. This could comprise unlocking the storage container from a fixed base and it could comprise unlocking the storage container to allow access to the contents of the container.

BRIEF DESCRIPTION OF THE DRAWINGS

The present disclosure is described in conjunction with the following appended illustrations in which.

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION OF THE EMBODIMENTS

Embodiments of the invention can comprise systems, devices, and methods for controlling lockable access. The features and structure of such a system, device, and or method can include, but are not limited to:

(a) A module installed into or proximate to an existing intercom-based access control appliance located in multi-unit building, building complex, garage or other parking facility, or similar;

(b) The module could be configured to be installed as a retrofit to an existing intercom device in a single unit of a multi-unit building, building complex, garage, or other facility;

(c) The module could be configured to be installed as a single retrofit to an existing central controller for an access control system having more than one intercom;

(d) The module could have an internet connection (Wi-Fi or cellular phone), a Bluetooth connection, and/or some other type of communication connection, any of which connections could be wired or wireless;

(e) The Bluetooth connection could be configured for connecting the existing intercom to one or more electronic devices that are within Bluetooth range;

(f) The communication connection could be configured to remotely receive a ringer (or buzzer) signal and to transmit a door open signal;

(g) The module could be configured to send and receive voice, image, and/or video communications;

(h) The module could comprise an autonomous entry controller responsive to an unlock code;

(i) The autonomous entry controller could be responsive to a pulsed code and this response could comprise generating an unlock signal;

(j) The autonomous entry controller could generate and transmit pulsed codes to a user; and/or (k) The device could be configured to unlock a fixed or movable storage unit. This could comprise unlocking the storage container from a fixed base and it could comprise unlocking the storage container to allow access to the contents of the container.

1. Communication Module Configured for Retrofitting to an Intercom Lock System

Figure 1:
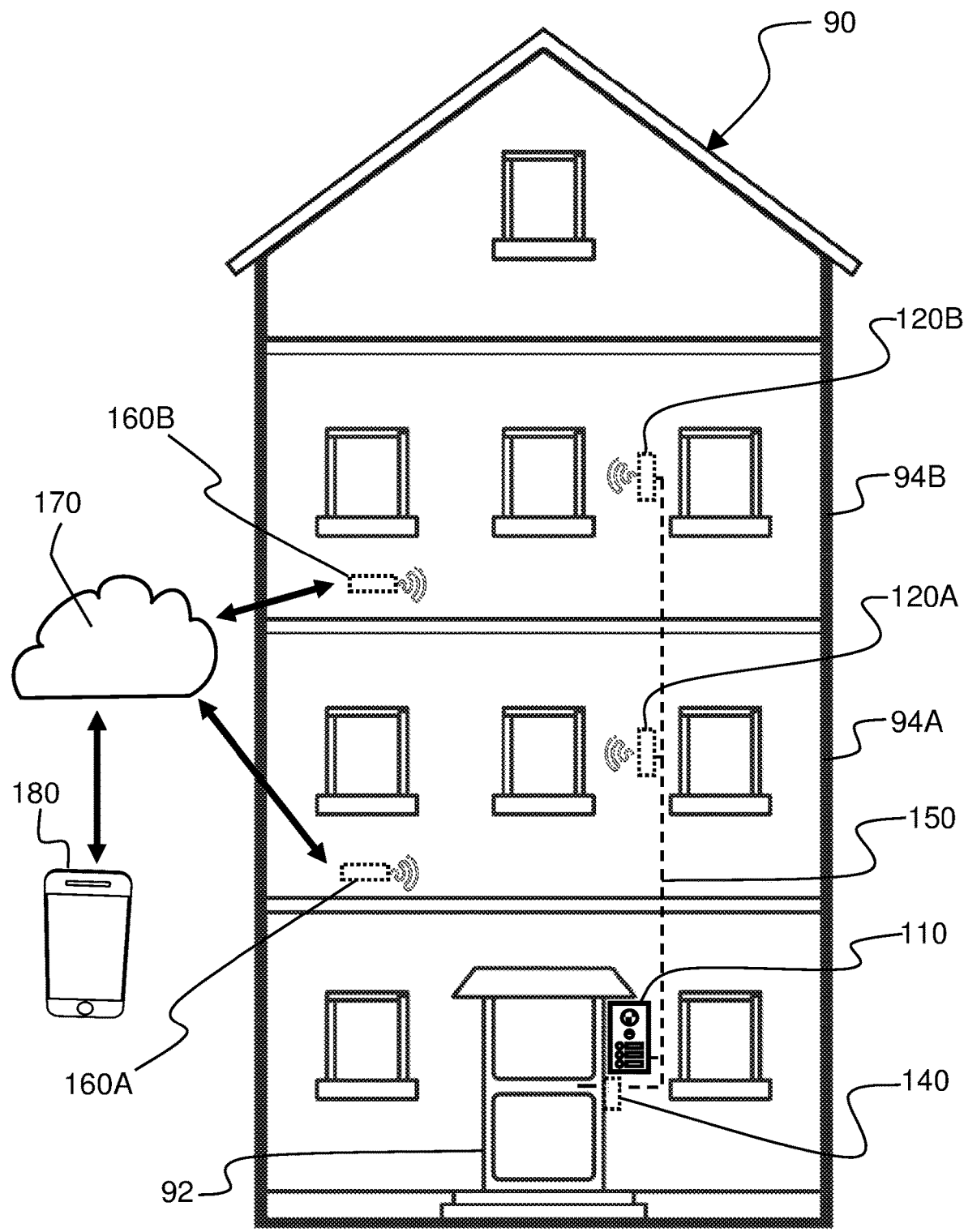
FIG. 1 shows a multi-unit building that has an intercom-based access control system configured for remote monitoring and control.

Referring now to the illustrations, FIG. 1 shows a building complex comprising a plurality of occupancy units (multi occupancy unit complex 90) with an access control system (110, 120A, 120B, and 150). The access control system is configured for connecting to the internet 170. The multi occupancy unit complex 90 could be a multi-unit office building, a multi-unit residential building, a multi-unit complex having separate buildings with a wall or fence around the complex, or any other structure or combination of structures with a securable perimeter and a secure means of providing or denying human access to the interior of the building or complex. In the example shown in FIG. 1, the multi occupancy unit complex 90 is a residential building comprising a lower dwelling, shown at 94A, and an upper dwelling, shown at 94B. There is common lockable entry door, shown at 92, that controls access to the interior of the building (or complex) 90. An access control system has been installed to facilitate remote unlocking of the entry door 92. The access control system comprises the following elements:

An external communication panel 110 on the periphery of the complex (or building) 90, the external communication panel 110 further comprises a plurality of call buttons, a speaker, and a microphone;

A plurality of intercom appliances, shown at 120A (lower dwelling intercom) and 120B (upper dwelling intercom), that are configured for communicating with the external communication panel 110;

A remotely controllable door strike 140 (i.e. a lock deactivation module) configured to release the entry door 92 in response to a signal from one of the intercoms 120A and 120B; and Intercom system wiring, shown at 150, that connects the external communication panel 110, intercoms (120A and 120B), and door strike 140. Typically, this intercom system wiring 150 is implemented using a low-voltage (either direct current or alternating current) circuit and typical voltages for this circuit are between 10V and 32V.

It should be understood that the intercoms (120A and 120B), door strike 140 (lock deactivation module), and communication network 150, are typically not visible from outside the building. This is why these components have been shown with dashed (hidden) lines in FIG. 1.

The intercom-based access control system shown in FIG. 1 further comprises remote communication functionality in each intercom (120A and 120B). In the configuration shown in FIG. 1, the remote communication functionality is used to communicate via WiFi to the internet and from the internet to a remote device. More specifically, FIG. 1 shows a lower dwelling WiFi router and internet modem 160A configured for connecting the lower dwelling intercom 120A to the internet 170 and from there to a mobile phone 180. FIG. 1 also shows an upper dwelling WiFi router and internet modem 160B configured for connecting the upper dwelling intercom 120B to the internet 170 and from there to the mobile phone 180. The system illustrated in FIG. 1 can be configured for remote monitoring and control of an intercom-based access control system as will be described further in this document.

Figure 2:
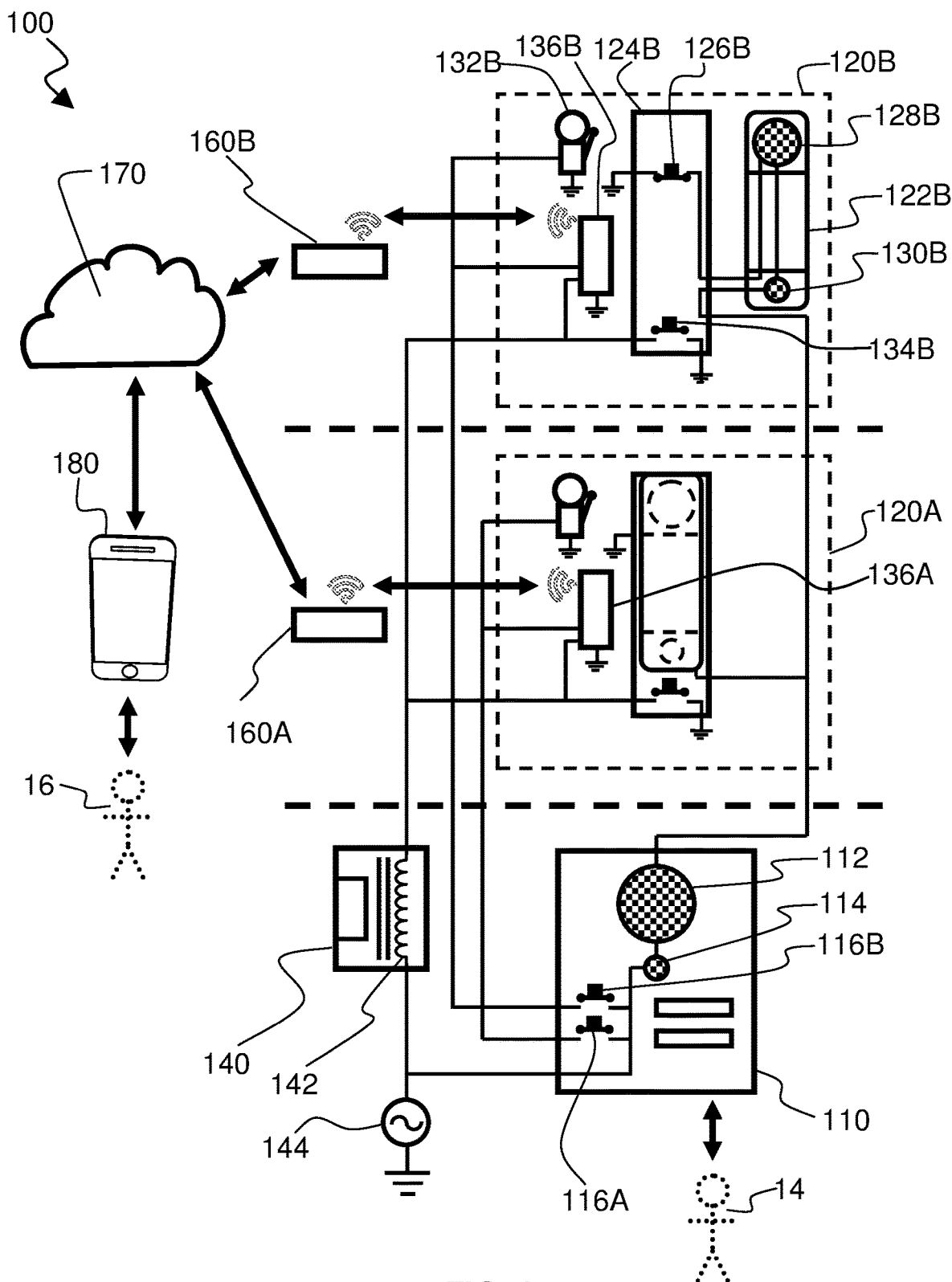
FIG. 2 shows a more detailed view of one embodiment of the intercom-based access control system of FIG. 1.

FIG. 2 illustrates more detail of one embodiment of the intercom-based access control system that was shown in FIG. 1. The embodiment of the intercom-based access control system 100 in FIG. 2 comprises the following elements that were previously shown and described with reference to FIG. 1:

An external communication panel 110;

A plurality of intercom appliances, 120A and 120B, configured for communicating with the external communication panel 110, at least one of which (120A and/or 120B) is further configured for WiFi communication;

A remotely controllable door strike 140 configured to release the entry door (92 in FIG. 1) in response to a signal from one of the intercom appliances, 120A or 120B;

At least one WiFi router/internet modem (160A or 160B) configured for communication between the internet appliance (120A or 120B) and the internet 170;

The internet 170; and

A remote device, such as the mobile phone 180.

In FIG. 2, a visitor 14 is shown interacting with the external communication panel 110. FIG. 2 also shows that the upper dwelling intercom appliance 120B, is off hook, which means that the upper dwelling intercom handset 122A has been taken off the upper dwelling intercom base 124A, which causes the upper dwelling intercom hook switch 126A to close, creating a live circuit that connects an upper dwelling intercom speaker 128B and an upper dwelling intercom microphone 130B with an external communication panel speaker 112 and an external communication panel microphone 114. The structure of this circuit can be any voice telephone circuit capable of being understood by anyone skilled in the art.

Also shown in FIG. 2 is an upper dwelling intercom ringer (or buzzer) 132B. Such a ringer (or buzzer), is typically part of an intercom appliance, but could also be mounted separately. The upper dwelling intercom ringer 132B connects to an upper dwelling call button 116B, located on the external communication panel 110. There is a similar lower dwelling call button 116A on the external communication panel 110 for actuating the ringer in the lower dwelling. If there were more occupancy units in a multi occupancy unit complex, there could be more call buttons or a numeric keypad for connecting a visitor of the complex to the correct occupancy unit in the complex.

In the configuration shown in FIG. 2, the upper dwelling intercom appliance 120B also comprises an upper dwelling intercom door strike coil actuator, shown at 134B. The upper dwelling intercom door strike coil actuator 134B shown in FIG. 2 is a normally open push button switch. When an occupant of the upper dwelling presses this normally open push button switch 134B, the circuit in the remotely-controllable door strike 140 closes, which causes current to flow through a door strike coil 142, which in turn causes a solenoid to actuate (or a magnet to release), allowing the lockable entry door, 92 in FIG. 1, to be opened. It can be understood that the lower dwelling intercom appliance 120A can comprise the same components that provide the same functionality as the upper dwelling intercom appliance 120B.

The intercom-based access control system, shown at 100 in FIG. 2, can further comprise one or more remote wireless communication modules shown at 136A (for the lower dwelling intercom appliance) and/or 136B (for the upper dwelling intercom appliance). These remote wireless communication modules, 136A and 136B, could be retrofitted into existing intercom appliances located in occupancy units in a multi occupancy unit complex to provide communication between an intercom access control system for a multi occupancy unit complex and "the outside world". In the embodiment shown in FIG. 2, the remote wireless communication modules 136A and 136B are configured for communicating with one or more WiFi router internet modems, 160A and/or 160B. These WiFi router internet modems, 160A and/or 160B, can be configured to connect to the internet 170, to facilitate communication with one or more remote internet-connected devices, such as the mobile phone 180. The mobile phone 180, then be used to communicate with a remote user with access control privileges, shown at 16.

The system, device, and/or methods for connecting a remote device unlocking intercom to a communication network, as shown in FIG. 2 should ideally be adaptable to a variety of input power sources. In the embodiment shown in FIG. 2, the remote wireless communication modules, 136A and 136B, are powered by the same source used to power other parts of the existing intercom-based access control system. In FIG. 2, the power source for the existing intercom access control system comprises an alternating current (AC) power supply 144. Different intercom systems have different power supplies, with typical voltages ranging from 10V to 32V AC (alternating current). Some intercom systems have a DC (direct current) power source instead of AC and the voltage of these direct current sources are typically also in the range of 10 to 32 volts (DC). In the embodiment shown in FIG. 2, the remote wireless communication modules, 136A and 136B, are powered by the same current that flows through the door strike coil 142. This means that the remote wireless communication modules, 136A and 136B, must draw a very small current, below a threshold that would cause the door strike coil 142 to energize and unintentionally release the remotely controllable door strike 140, unlocking the entry door, 92 in FIG. 1. Based on testing a variety of intercom systems, it has been experimentally determined that the maximum current threshold that the communication modules can draw cannot be more than 30 milliamps in some intercom systems, more than 50 milliamps in other intercom systems, and more than 100 milliamps in yet other intercom systems. This means that power management of the remote wireless communication modules, 136A and 136B, is a critical element of the way in which these communication modules are implemented. The current drawn by the sum of all of the remote wireless communication modules, 136A and 136B in the example shown in FIG. 2, must always be below the maximum current that can be consumed without tripping the door strike coil 142.

Figure 3:
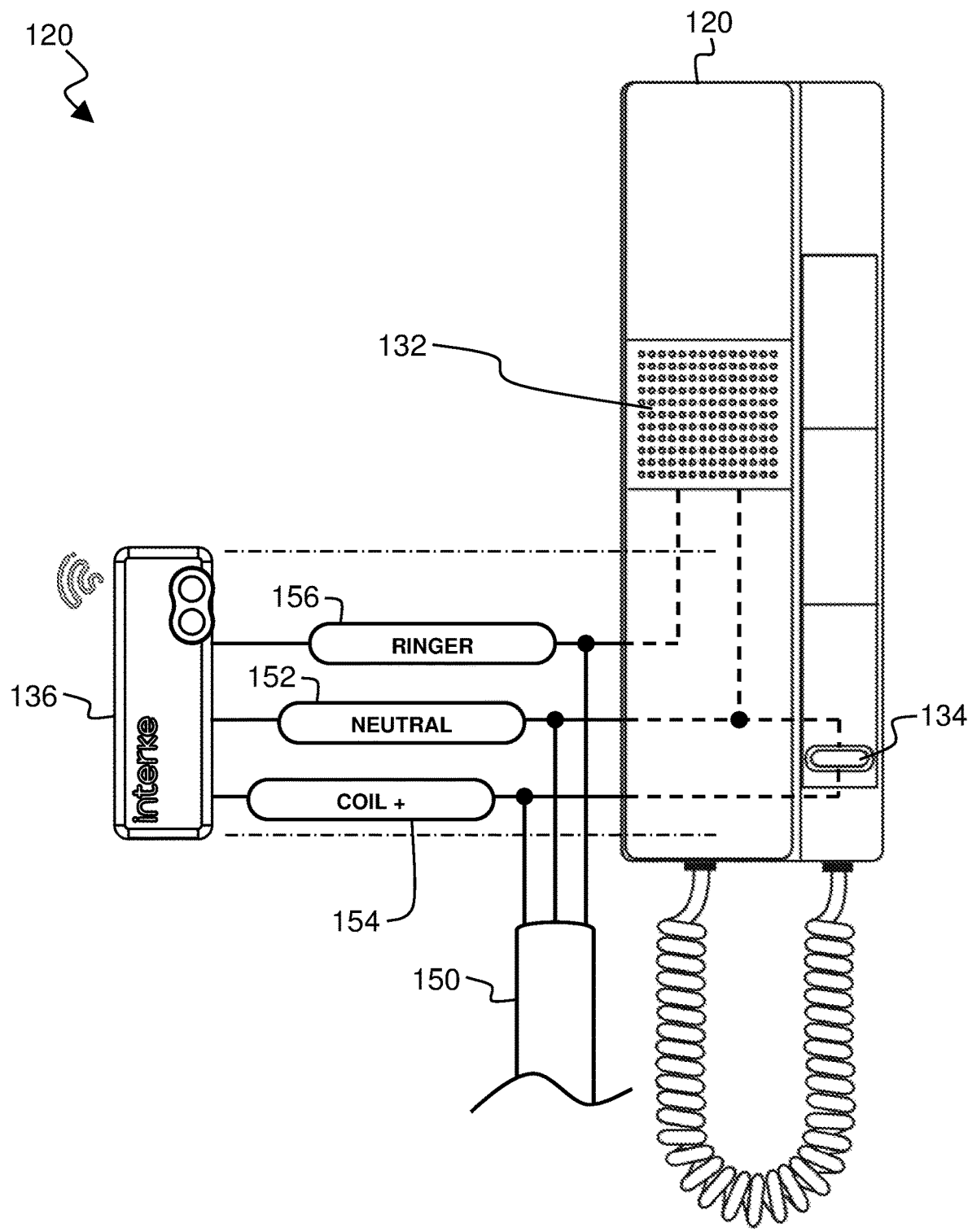
FIG. 3 shows how a wireless remote communication module can be configured for placement inside an intercom appliance.

FIG. 3 shows a remote wireless communication module 136 configured for placement inside an intercom appliance 120 to create an embodiment of an intercom appliance configured for remote communication 120. The intercom appliance 120 could be any intercom device that is configured for placement in a dwelling or office wherein the intercom appliance 120 is used for access control, such as control of the remote door strike, 140 in FIG. 1 and FIG. 2. The intercom 120 could comprise an intercom base and an intercom handset, as was described with reference to FIG. 2. The remote wireless communication module 136 could be configured to be placed in the intercom base or the intercom handset. In the embodiment shown in FIG. 3, the remote wireless communication module 136 is connected in parallel to three wires of the intercom system wiring 150:

(a) A positive wire of the coil (COIL+), shown at 154 in FIG. 3,
(b) A neutral (or ground) wire, shown at 152 in FIG. 3; and
(c) A ringer wire, shown at 156 in FIG. 3.

It should be noted that the intercom wiring 150 was labeled and shown in FIG. 1. The intercom wiring is visible, but not specifically labeled in FIG. 2.

Continuing with the description of FIG. 3, connecting the COIL+ wire 154 to the neutral wire provides two functionalities described in greater detail in other parts of this document:
(a) When a low amount of current is drawn by the connection between COIL+ wire 154 and the ground wire 152 in the remote wireless communication module 136, this low amount of current can be used to power the communication module 136; and
(b) When a high amount of current is allowed to pass between the COIL+ wire 154 and the ground wire 152 (i.e. the COIL+ wire 154 is shorted to the ground wire 152), the communication module 136 creates a parallel bypass of the door strike coil actuator switch 134 on the intercom base to energize the door strike coil (142 in FIG. 2) which causes the door strike (140 in FIG. 1 and FIG. 2) to unlock the door (92 in FIG. 1).

Further referring to FIG. 3 The remote wireless communication module 136 is connected to the ringer wire 156 and the neutral or ground wire 152 to provide a circuit that operates in parallel to the to the ringer (or buzzer) 132 of an intercom appliance 120 to provide the ability for the communication module 136 to detect when a call button (such as 116A or 116B in FIG. 2) has been pressed. The ability for the communication module 136 to detect actuation of a call button switch (116A or 116B in FIG. 2) allows call button actuation information (such as the closure of a switch) to be transmitted by the remote wireless communication module 136 to a remote location, as will be discussed further in other parts of this document. The ability of the communication module 136 to unlock a device that is connected to the intercom-based access control system will also be discussed further in this document.

It should be noted that FIG. 3 does not show any of the circuitry associated with voice communication between the external communication panel (110 in FIG. 1 and FIG. 2), the intercom appliance 120, and/or the remote wireless communication module 136. It can be understood that this voice communication functionality between the external communication panel and the intercom appliance 120 is a part of most existing intercom systems. It can also be understood that it is possible to connect the voice communication wire or wires of the intercom appliance 120 to the connection module 136 to provide the ability to use the remote connection module 136 for voice connection with remote devices through the internet or other communication network. However, it should be noted that not all embodiments of the present invention include such voice communication functionality and much can be done with a simpler communication module 136 that does not include this voice communication functionality. For example, voice communication between a visitor at the periphery of the complex and a person with access control permission can be provided via a mobile phone connection. This person with access control permission could be remote from the building or complex, but have a device that communicates with the access control system. This remote person with permission and a suitable device, could then transmit an unlock signal that actuates the door strike coil of the intercom-based access control system to allow the visitor to enter the complex (or building).

Figure 4:
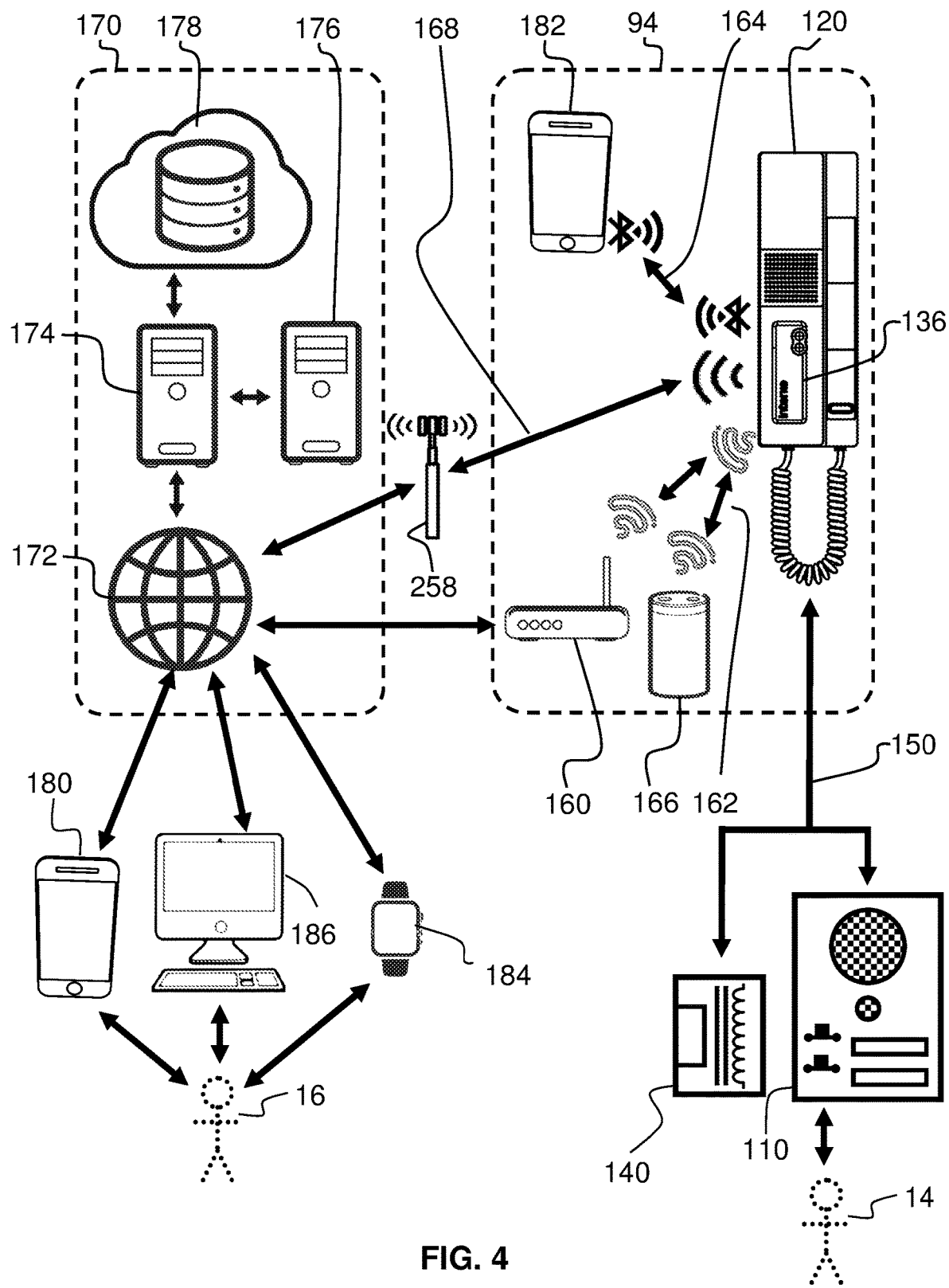
FIG. 4 shows other elements of the WiFi, internet, cellphone, and Bluetooth intercom-based access control systems of FIG. 1 and FIG. 2, using the wireless communication module of FIG. 3.

FIG. 4 shows the remote wireless communication module 136 in an intercom appliance 120 being used to connect a variety of electronic devices. In the embodiment shown in FIG. 4, the communication module 136 and intercom appliance 120 are connected to the external communication panel 110 and door strike 140 through the intercom wiring system 150 that was previously described with reference to FIG. 1 and FIG. 3. The visitor 14 is shown interacting with the external communication panel.

The remote wireless communication module 136 in FIG. 4 can serve as a gateway to a variety of other devices using WiFi signals, shown at 162, and Bluetooth signals, shown at 164. For example, inside a dwelling (or office, or similar) 94, the communication module 136 might communicate via Bluetooth signals 164 to a Bluetooth enabled mobile phone 182, and this communication might use a Bluetooth Low Energy protocol. It can be understood that this Bluetooth communication could be with other products, such as a keypad, or any other Bluetooth-enabled device capable of being understood by anyone skilled in the art.

The keypad used in this embodiment and other embodiments in this document can have additional features. For example, in one embodiment the keypad could be configured so that it doesn't have unique passcodes saved into it. Once installed, such a keypad could connect to any embodiment of the access control systems described herein and also connects to the internet cloud. In this configuration, the keypad could act like a phone. When a user has access to a certain access control products, the keypad could communicate through the internet cloud to acknowledges that the user has been granted access to this access control system, after which, it gives an order to the lock to unlock. Instead of entering a unique passcode saved in the keypad:

A) Each user, when he/she creates their profile on the mobile app, might have to create their own passcode (PIN number)—just like a phone passcode to unlock it, like a private own password; or B) This passcode can be used on any keypad connected to any access control system described herein. This means, that if a user has access to an access control system as I guest, this user could use their own passcode to access this system. No other user can know this passcode. Also allowing the user to access through a different medium, other than his phone—in the case where let's say his battery is drained.

The communication module, 136 in FIG. 4, might communicate to a smart speaker 166 via WiFi signals 162. The communication module 136 might communicate with a WiFi router 160 via WiFi signals 162 and the WiFi router might comprise an internet modem 160 configured to communicate onward to the internet 170. Alternatively, or additionally, the communication between the wireless communication module 136 and the internet 170 might comprise the use of a cellphone signals 168 between the wireless communication module 136 and a cellphone network 258 that connects to the internet 170. Such cellphone signals might be 3G, 4G, 5G, or any other cellphone signaling system capable of being understood by anyone skilled in the art.

The internet 170 may comprise an internet gateway 172, an MQTT (Message Queuing Telemetry Transport) server 174, a cloud database 178, and a cloud control server 176. Thus, the internet gateway 172 could allow a mobile phone 180, a smart watch 184, and a computer 186 to connect to the remote connection module 136 to send signals to and receive signals from the external communication panel 110, which could control a door strike 140 of an intercom-based access control system, 100 in FIG. 2. A remote person with access control privileges 16, could interact with the mobile phone 180, the smart watch 184, and/or the computer.

The system shown in FIG. 4 can be configured to use an IoT (Internet of Things) messaging protocol, such as MQTT (Message Queuing Telemetry Transport) on top of a TCP/IP protocol such as is used by typical internet routers, or on top of non-TCP/IP protocols such as ZigBee. Such messaging protocols can be used to minimize bandwidth and code footprint requirements for IoT communication.

The system shown in FIG. 4 can further comprise authorization and client services management functionality. These functions can be performed by an internet-connected device, such as the computer shown at 186. These authorization and client services management functions can be managed by the cloud control server 176 and key parameters can be stored in the cloud database 178.

The central access control system shown at 100 in FIG. 2, and further described with reference FIG. 1, FIG. 3, and FIG. 4 can enable a person with access control permission to a multi-occupancy unit complex (16 in FIG. 4) to remotely provide access to the complex. This access control system, 100 in FIG. 2, comprises a remote wireless communication module 136 that is configured to be installed into an existing intercom system architecture, to provide remote monitoring and control functionality. As can be seen in FIG. 1 and FIG. 2, the central access control system comprises an external communication panel 110 and an electronic door strike 140 that are communicably coupled to a plurality of intercom appliances (120A and 120B) located in different dwellings, offices, or similar. The external communication panel 110 is configured to receive input from a visitor. The external communication panel 110 is also communicably coupled with the electronic door strike 140 through the intercom appliances, 120A and 120B, that are configured to actuate the electronic door strike 140 enabling a lock to be disengaged. Such actuation or control messages can be sent upon receipt of an instruction to do so from an intercom appliance 120 in FIG. 3 or FIG. 4 (or 120A or 120B in FIG. 1 or FIG. 2) that includes a remote wireless communication module (136 in FIG. 3 and FIG. 4, or 136A and 136B in FIG. 2). The communication module can connect to external devices through a communication interface. This communication interface can communicate via a WiFi protocol, a Bluetooth protocol such as Bluetooth Low Energy, or any other communication protocol capable of being understood by anyone skilled in the art. The communication interface can communicate with other devices inside a dwelling unit or office, 94 in FIG. 4, and these other devices can comprise Bluetooth enabled mobile phones 182, and WiFi devices such as smart speakers 166 and/or WiFi internet routers 160.

In the system shown in FIG. 1 to FIG. 4, the central access control system shown at 100 in FIG. 2 is further configured to send and receive signals from additional sources, via a communications network. In the configuration shown in FIG. 4, this configuration comprises an internet connection between a WiFi router and internet modem 160 and an internet gateway 172. The internet gateway 172 can further communicate with a messaging (MQTT) server 174, a control server 176, and a database 178, all of which can be located in the internet cloud 170, by being at a hosting location. The internet gateway 172 can communicate with internet connected devices and these internet connected devices can comprise a mobile phone 180, a smart watch 184, a computer 186, and any other internet device capable of being understood by anyone skilled in the art, including but not limited to smart speakers, home automation devices, tablet computers, laptop computers, etc.

Figure 5:
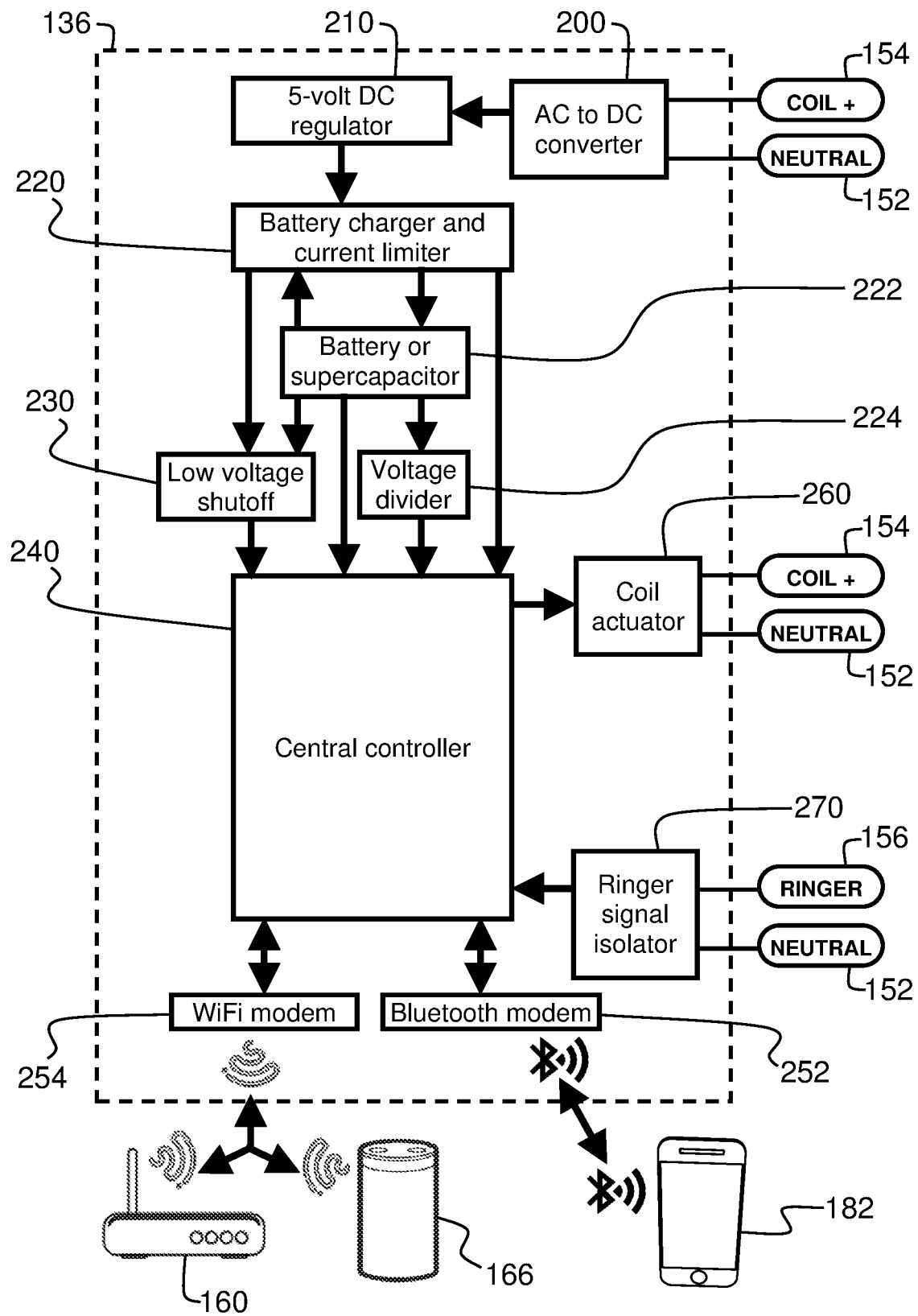
FIG. 5 is a block diagram of the wireless remote communication module of FIG. 3.

FIG. 5 shows a block diagram of one embodiment of the remote wireless communication module 136 and how this communication module can be connected to (a) the intercom system, (b) internet devices, and (c) Bluetooth devices. As shown in FIG. 5, the coil electrical connection wire (COIL+) 154 and neutral wire 152 of the intercom system are connected to an AC to DC converter circuit 200. The output of the AC to DC converter circuit 200 is connected to a 5-volt DC (5-volt direct current) regulator circuit 210. The output of the 5-volt DC regulator circuit 210 is connected to a battery charger and limiter circuit 220 and to a battery 222 (and/or supercapacitor/ultracapacitor). The battery (and/or other electrical storage device) 222 is connected to a voltage divider circuit 224. The battery charger and limiter circuit 220 and the battery 222 (and/or supercapacitor/ultracapacitor) are connected to a low voltage shutoff circuit 230. The battery charger and current limiter circuit 220, the battery 222 (or other type of electrical storage device), the low voltage shutoff circuit 230, and the voltage divider 224 circuit all connect to a central controller 240. The central controller 240 interfaces with a WiFi modem 254 and a Bluetooth modem 252. The WiFi modem 254 and/or Bluetooth modem can be configured to communicate wirelessly with internet devices (and therefore the internet) through devices such as a WiFi internet router 160 and/or a smart speaker 166 as was discussed previously with reference to FIG. 4. The Bluetooth modem 252 can also be configured to communicate wirelessly with Bluetooth devices such as the Bluetooth enabled mobile phone 182 that was discussed previously with reference to FIG. 4. The mobile phone could be configured to communicate with the internet. The central controller 240 can send a signal to a coil actuator 26, which is configured to engage the coil (142 in FIG. 2) which unlocks a remote door, as was discussed with reference to FIG. 2. This is done through a connection with the (COIL+) 154 and neutral wire 152 of the intercom system. The central controller 240 is also responsive to a ringer signal isolator circuit 270, which is attached to the ringer 156 and neutral 152 wires of the intercom system.

Figure 6:
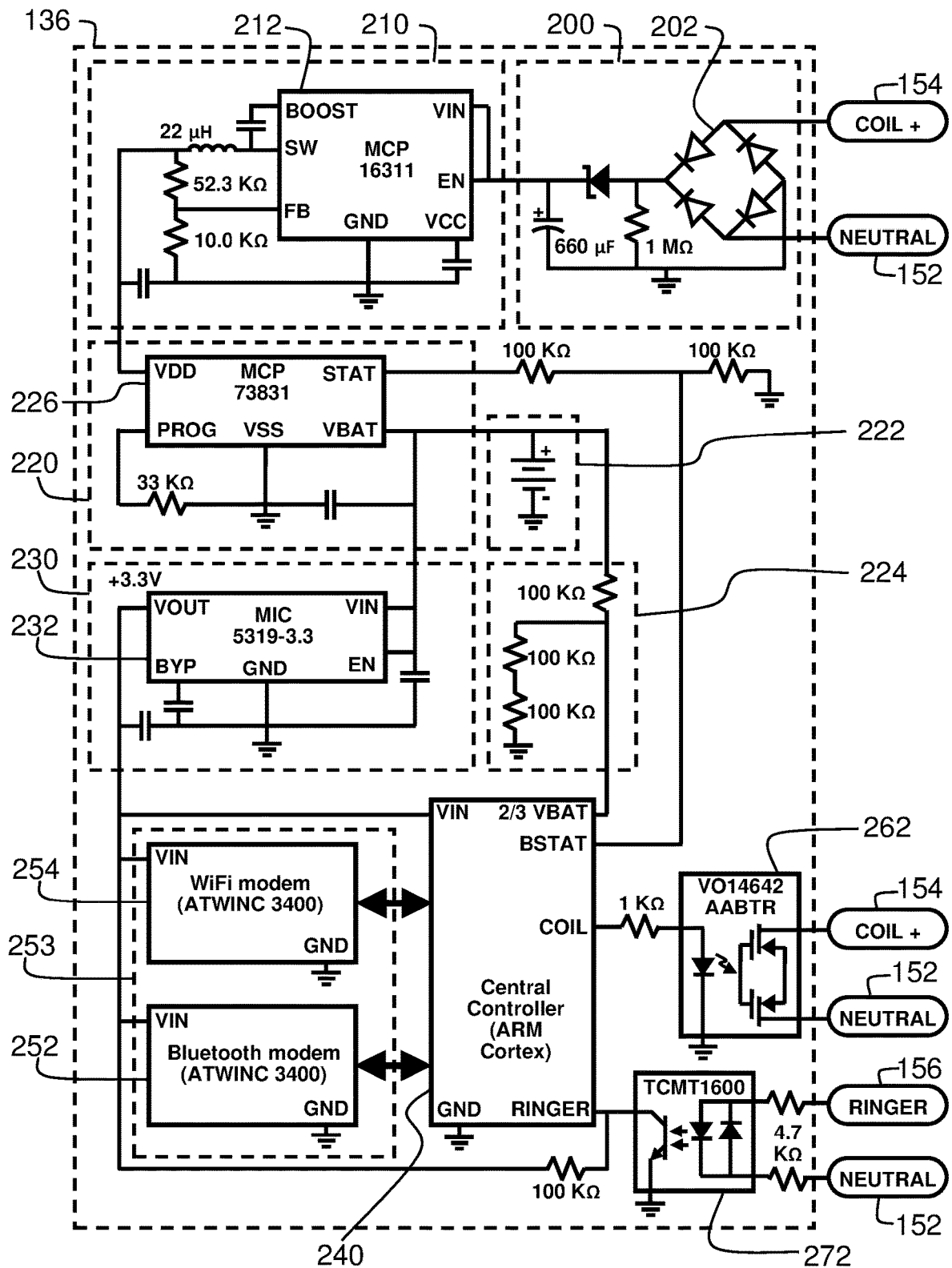
FIG. 6 is a more detailed electrical circuit diagram of the wireless module of FIG. 3 and FIG. 5.

FIG. 6 shows a more detailed electrical circuit diagram of one embodiment of the wireless module 136 that was shown in block diagram format in FIG. 5. This wireless module was also identified in FIG. 2, FIG. 3 and FIG. 4. Referring to FIG. 6, the AC to DC converter circuit 200, can be configured to receive electrical power from the coil of the intercom system through the NEUTRAL 152 and COIL+ 154 connections that are part of the intercom system that was shown in FIG. 3. The NEUTRAL connection 152 can also be thought of as the "AC ground" for the intercom system, and should not be confused with the "DC ground" for the wireless module, as these two connections can be independent. The COIL+ connection 154 is electrically connected to the wire that connects the coil, shown at 142 in FIG. 2, to the wireless modules, shown at 136A and 136B in FIG. 2. Note that the connection between the COIL+ 154, NEUTRAL 152 and the AC to DC converter circuit 200 may also include transient voltage suppression (TVS) diodes that act as surge protectors (limiting the voltage to 40 Volts, for example), a wired header and/or connector to make connection and disconnection easier, and a fuse to minimize damage that might be caused by a short circuit. The AC to DC converter circuit is configured to operate on coil currents that are below a threshold value that would cause the coil to actuate and release the door strike that was shown at 140 in FIG. 2.

As shown in FIG. 6, current from the COIL+ 154 and NEUTRAL 152 connections of the intercom system go through a diode bridge circuit 202, which is part of the AC to DC converter circuit 200, which flips the negative part of the AC sine wave to positive. FIG. 6 shows a full bridge rectifier diode bridge circuit 202. It can also be understood that a half bridge rectifier circuit could be used. An electrolytic capacitor is then used to smooth out the ripples in the rectified current. In one embodiment, the capacitance is provided by two 330 microfarad electrolytic capacitors in parallel, which produces a total capacitance of 660 microfarads as shown in FIG. 6. The system shown in FIG. 6 is designed to use a 12-36 volt (50-60 Hz) AC source and draw no more than 30 mA, in order not to actuate the coil and unlock the door. In some cases, more current than this may be drawn (such as 100 mA) before the coil actuates. As a rough calculation, a 30 mA current draw for a 12 Volt input equates to a 400 Ohm load, which would give a time constant (Resistance×Capacitance) of 0.264 seconds, which is gives a reasonably low ripple for a 50-60 Hz input (0.016 to 0.2 wavelength). This ripple is further reduced by the Schottky diode and 1 Megaohm parallel resistor in the circuit. It is also possible to place a 1 Ohm resistor in series with the load at the output of the AC to DC converter circuit 200 to measure the current being drawn by the load as a voltage drop, which can be looked at using a multimeter, an oscilloscope, or as an input to the controller in the system.

It should be noted that the AC to DC converter circuit 200 in FIG. 6, could be used with any alternating current source (such as a transformer, alternator, or inverter) in the right voltage range (12-36 Volts AC), not just a coil actuation circuit. In that case the COIL+ 154 and NEUTRAL 152 locations of the module 136 are connected the two outputs of the alternating current source being used to power the module 136.

The output of the AC to DC converter circuit 200 is direct current (DC) electrical power at 12 to 30 Volts, that is then fed into a 5-Volt DC regulator, shown at 210. In one embodiment, the 5-volt DC regulator uses an integrated step-down DC to DC converter (also known as a charge management controller chip), such as the MCP 16311 chip shown at 212. The specific DC to DC converter integrated circuit 212 shown in FIG. 6 can be configured to receive any DC input in the range of 4.4 Volts to 30 Volts and produce any DC output in the range of 2.0 Volts to 24 Volts based on the voltage divider circuit formed by two resistors in series that are attached between the SW (switching output), the FB (feedback), and GND (ground) pins. This is done by holding the feedback (FB) output to 0.8 Volts. Since GND is 0 Volts, and the current into FB is negligible, this means that a combination of a 52.3 kiloohm resistor and a 10 kiloohm resistor in series will produce an output of 5 Volts DC at the output of the SW (switching) pin. A 22 microhenry inductor and a bypass capacitor on the output are used to further reduce high-frequency ripples in the output voltage at the SW pin. The capacitor between the SW (switching output) pin and the BOOST pin is used to control an NMOS switch in the DC to DC charge management controller chip 226. The VCC pin is used for the internally supplied voltage to make the integrated circuit operate. It is coupled to ground with an external bypass capacitor to provide high peak current for the gate drive. This combination of resistors, capacitors, and an inductor in the 5-Volt DC regulator circuit also provides a power buffer for several milliseconds when the coil is activated. Longer power interruptions are handled by the battery, which will be described later in this document.

When the coil (or other AC power source) is supplying power to the AC to DC converter circuit 200, the output of the DC to DC converter (Voltage regulator) circuit 210 is a stable 5V supply that is fed into the battery charger and current limiter circuit shown at 220. In one embodiment, the charger and current limiter circuit uses an MCP 73831 charge management controller made by Microchip and shown at 226. The maximum current provided by the charge controller is determined by the value of the resistor between the PROG pin and ground (GND pin) in accordance with equation that the maximum output current at VBAT is 1000 Volts divided by the value of the resistor between PROG and GND. In the case of the 33 kiloohm resistor on the PROG pin of the charge management controller 226, the result is that the charge management controller limits the current supplied to the battery at VBAT to 30 milliamps (1000/33000 Amps). This limitation on the output of the charge management controller 226 indirectly limits the current draw from the coil. It directly limits the maximum current that can be drawn by the rest of the circuit, and in particular the electrical energy storage device, shown at 222. The electrical energy storage device 222 can by any battery capable of being understood by anyone skilled in the art, including but not limited to lithium batteries, nickel cadmium batteries, alkaline batteries, zinc batteries, and batteries comprising lead. The electrical energy storage device 222 could also be a supercapacitor or an ultracapacitor or any other device or combination of devices configured for storing electrical energy. For purposes of this document and the appended claims, a supercapacitor and an ultracapacitor are considered the same type of device, and both are considered to be a type of capacitor.

The voltage at VBAT of the charge management controller chip 226 depends upon the voltage of the battery 222 and will be about 4.2 Volts when the battery 222 is fully charged and the coil (or other AC power source) is supplying power to the AC to DC converter circuit 200. The status of the battery and the supply circuitry are monitored in two different ways. The first way is that the STAT pin of the charge management controller 226 will go high (+5V) if the battery is charged and will go low (0V) if the battery is charging. The output of the STAT pin is put through a charge management controller status voltage divider to bring the voltage to +2.5V if the battery is charged and 0V if the battery is charging. The resulting voltage is sent to a pin on the central controller 240 to allow the central controller 240 to monitor the current state of the charging circuit. The voltage of the STAT pin is reduced because the central controller 240 is powered by a 3.3 Volt source and cannot read voltages greater than 3.3 Volts.

The second way in which the battery and supply voltage are monitored are to read the battery voltage. This is done by taking the battery voltage (VBAT) and putting it through a battery output voltage divider circuit 224 that comprises 100 kiloohm resistors in series to generate an output voltage that is ⅔ of the battery voltage. This ⅔ VBAT is then fed to a pin in the central controller 240 to allow the central controller 240 to monitor the voltage of the battery 222 (and/or capacitor, supercapacitor, ultracapacitor, or similar) on an ongoing basis. The battery output voltage divider circuit 224 ensures that the battery output voltage, which can be up to 4.2 Volts, has been reduced to ⅔ of this value (a maximum of 2.8 Volts) to be below the 3.3 Volt maximum that the central controller 240 can read.

The output of the battery charger and current limiter circuit 220 and/or the output of the battery and/or capacitor (or similar) are then fed into a low voltage shutoff circuit, shown at 230. The primary component in the low voltage shutoff circuit is a low dropout regulator integrated circuit shown at 232. In one embodiment, the low dropout regulator integrated circuit is an MID5319-3.3, a solid-state device that is designed to produce a stable 3.3 Volt output or shut down when insufficient power is available. The low dropout regulator integrated circuit enable pin (EN) has a Schmitt trigger, which causes the low voltage shutoff circuit 230 to operate in the following manner:
(a) If VIN for the low dropout regulator 232 is greater than or equal to 3.5 Volts, the low dropout regulator acts as a 3.3 Volt regulator, keeping VOUT to 3.3 Volts;
(b) IF VIN for the low dropout regulator 232 is between 3.3 and 3.5 Volts and decreasing from above 3.5 Volts, the low dropout regulator continues to act as a 3.3 Volt regulator, keeping VOUT to 3.3 Volts;
(c) IF VIN for the low dropout regulator 232 is between 3.1 and 3.3 Volts and decreasing, the VOUT will be the same as VIN;
(d) If VIN for the low dropout regulator 232 is less than 3.1 Volts, VOUT will be zero; and
(e) IF VIN for the low dropout regulator 232 is between 3.1 Volts and 3.5 Volts and increasing (VOUT was turned off), the low dropout regulator will keep VOUT to zero until VIN exceed 3.5 Volts.

The central controller 240 can be any microcontroller capable of being understood by anyone skilled in the art. In one embodiment, the central controller 240 is an ARM Cortex based microcontroller, a 32-bit RISC (reduced instruction set computer) based system that used a processor architecture licensed from Arm Holdings. The central controller 240 can be powered by the output of the low voltage shutoff circuit 230. It can receive status information from the charge management controller chip 226, and a voltage reading from the voltage divider 224 that is responsive to the voltage of the battery (and/or supercapacitor, or similar) 222. The central controller can also be configured to communicate with a WiFi modem (such as an ATWINC 3400), shown at 254, and a Bluetooth modem, shown at 252. In the embodiment shown in FIG. 6 the WiFi modem and Bluetooth modem are part of an integrated WiFI and Bluetooth modem, shown at 253. Connection from the central controller 240 and the WiFi modem 254 and/or Bluetooth modem 252 (or combined 253) could be through a synchronous serial connection such as SPI (Serial Peripheral Interface). To reduce power consumption, the system (using the central controller 240) could be configured to shut off the WiFi modem 254, Bluetooth modem 252, and/or combined modem 253 to reduce power consumption when one or both WiFi and/or Bluetooh communication functionality is not needed or when available power is limited. The central controller 240 could also comprise a UART (Universal Asynchronous Receiver/Transmitter), which could be used for debugging the system.

As shown in FIG. 6, the coil actuator circuit that was shown at 260 in FIG. 5, comprises a solid-state relay 262, a load resistor (1 kiloohm) between the COIL (trigger) output of the central controller 240 and the solid state relay 262 relay input, and output connections to the COIL+ 154 and NEUTRAL 152 wires of the intercom system that was shown in FIG. 2 and FIG. 4. The solid-state relay in this embodiment is a double direction optical MOSFET (Part number: VO14642AABTR) that can work with both DC and AC powered coils (142 in FIG. 2). When the COIL pin of the central controller goes high, the solid-state relay 262 closes the connection between COIL+ and NEUTRAL, which causes the coil (142 in FIG. 2) to release the remotely-controllable door strike (140 in FIG. 2) which releases the lock on the remote door (92 in FIG. 1).

As shown in FIG. 6, the ringer signal isolator circuit that was shown at 270 in FIG. 5, comprises a 100 kiloohm pull-up resistor and an opto-coupler, shown at 272. The opto-coupler in this embodiment is a TCMT 1600. The RINGER 156 and NEUTRAL 152 wires of the intercom system that was shown in FIG. 2 and FIG. 4 are connected through 4.7 kiloohm current limiting resistors to the inputs of the optocoupler 272, which can also be called a ringer signal isolator chip. The use of an optocoupler 272 with two diodes makes the inputs bi-directional, so that it can work with either an alternating current (AC) or a direct current (DC) coming from the RINGER wire 156.

The system of FIG. 6 can further comprise an indicator light and a pairing switch. These items will be shown and described with reference to FIG. 7.

Figure 7:
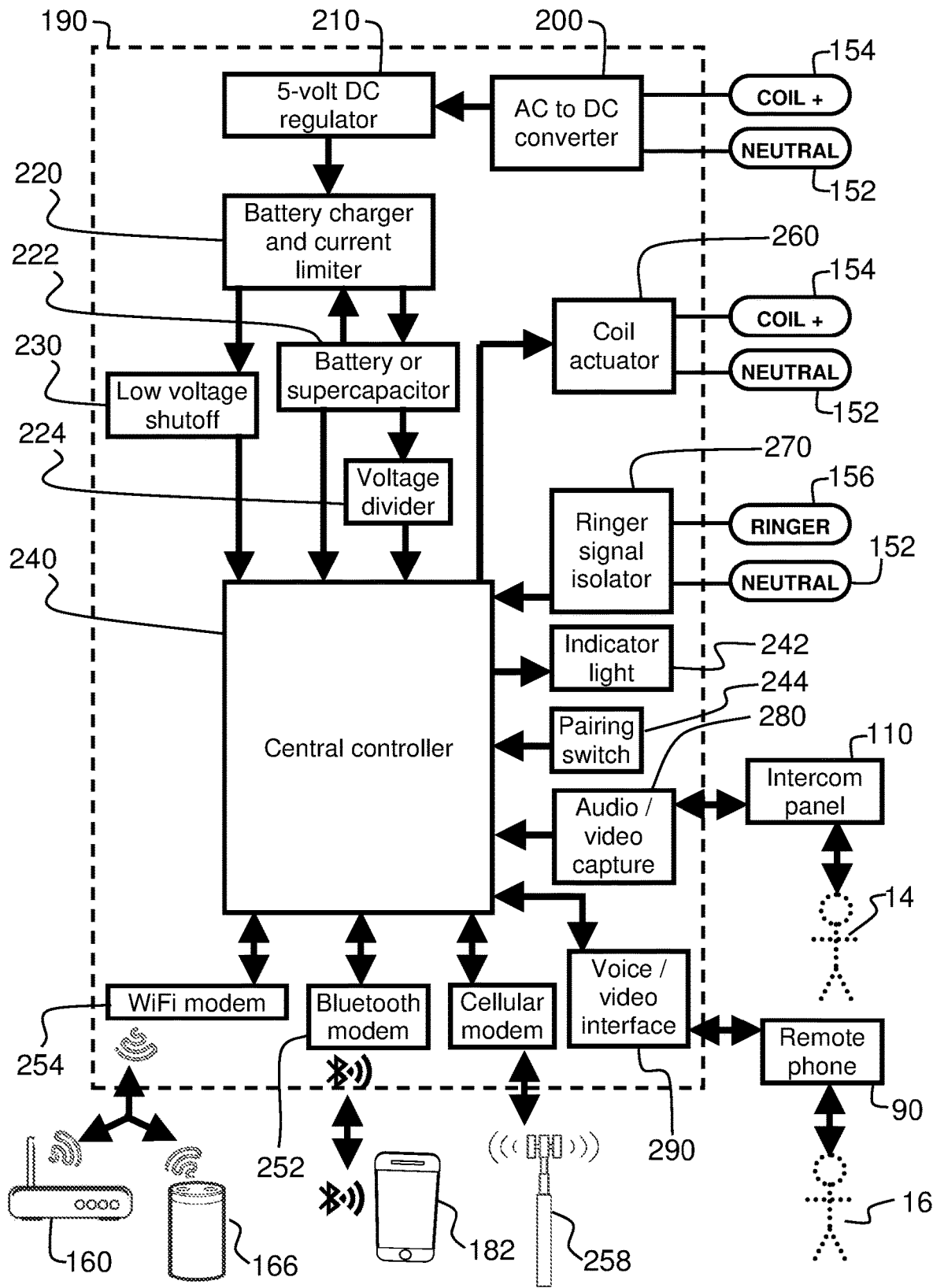
FIG. 7 shows the system of FIGS. 5 and 6 further comprising functionality to allow audio, video, and/or text communication between a visitor and a remote telephone and/or a cellular modem.

2. Voice (and/or Image and/or Text) Communication for Intercom Access Control System The system illustrated in FIG. 1 to FIG. 6 can be supplemented with voice, video, and/or text communication between a visitor, 14 in FIG. 4 and FIG. 7, and a person at a remote location with access control privileges, 16 in FIG. 4 and FIG. 7, in one of the following ways:
(a) Such communication could be via a mobile phone connection that is independent of the systems, methods, and devices described herein;
(b) The systems, methods, and devices described herein could be used to communicate in real time via (i) an audio capture circuit, 280 in FIG. 7, to connect the visitor 14 to the central controller 240 via the intercom panel 110 and (ii) a voice interface, 290 in FIG. 7, that communicates with a remote phone 90 to the remote person 16;

(c) Voice, video, and/or text information transmitted and received through the audio capture device 280 and the voice interface, 290 in FIG. 7, could be stored by the central controller 240 (and related storage devices) when the visitor 14 or remote person 16 is unavailable and transmitted when the visitor 14 or remote person 16 becomes available;

(d) This asynchronous voice, video, and/or text information transmission between the visitor 14 and remote person 16 could use an instant messaging and voicemail, video, and text storage and forwarding application, such as What's App;

(e) Communication between the central controller 240 and the remote person 16 could be via an internet connection using, for example the WiFi modem, 254 in FIG. 7, and a voice of IP (and/or video and/or text) application or protocol;

(f) Communication between the central controller, 240 in FIG. 7, and the remote person 16 and/or the visitor 14 could be via a cellular modem, 256 in FIG. 7, and a cellular phone network, 258 in FIG. 7; and/or (g) This communication could use any combination of the functionalities described herein.

Referring in more detail to the system illustrated in FIG. 7, the alternate module 190 of FIG. 7 is an alternate embodiment of the module 136 shown in FIG. 5. The alternate wireless remote communication module 190 in FIG. 7 includes all of the elements that were illustrated and described with reference to FIG. 5 and further includes an indicator light 242, an pairing switch 244, an audio capture circuit 280, and a voice interface circuit 290. The indicator light 242 can be a light emitting diode (LED) and can be used for generating various codes and as user interface. The pairing switch 244 can be:

(a) Used to send a reset signal to the system, in response to the pairing switch being held down for a set period, such as greater than 8 seconds;

(b) Used to set up a WiFi hotspot, in response to the pairing switch being held down for a set period, such as between 4 and 8 seconds; and/or (c) Used to pair the remote communication module (190 in FIG. 7 or 136 in FIG. 3-6) with a WiFi or Bluetooth modem.

The audio capture circuit 280 can be configured to connect to the intercom system for the building or complex (110, 120A, or 120B in FIG. 2, for example). Examples of configurations for how the audio capture circuit 280 could receive audio information from a visitor can comprise:

(a) The external communication panel, 110 in FIG. 2, could further comprise a wireless voice communication interface (not shown) that receives audio communication from the external communication panel microphone, 114 in FIG. 2, and transmits audio communication to the external communication panel speaker. This external communication panel wireless communication interface could transmit this voice information via a WiFi or IoT (Internet of Things) signal to the audio capture circuit, 280 in FIG. 7.

(b) The intercom speaker, 128B in FIG. 2, and intercom microphone, 130B in FIG. 2, could be wired to the audio capture circuit, 280 in FIG. 7.

The voice interface circuit 290 can be configured to connect to a remote phone 90 using any of the telephone interfaces capable of being understood by anyone skilled in the art, including, but not limited to a wired phone connection to a landline telephone at a remote location, a cellular phone connection to a cellular or landline telephone at a remote location, and a voice connection using a internet-based phone technology such as VoIP (Voice over Internet Protocol).

3. Smart Intercom Centralized for Whole Building

Figure 8:
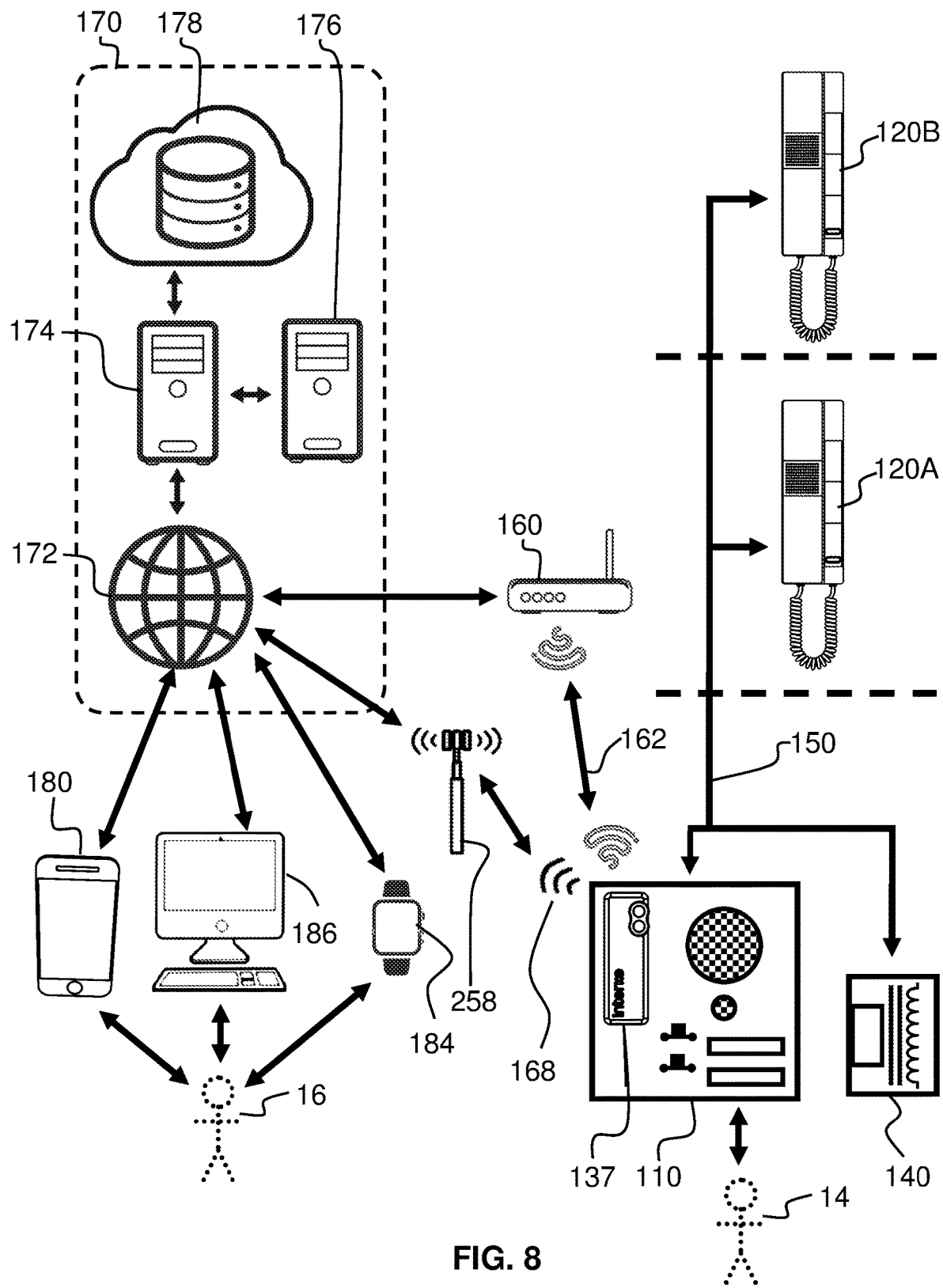
FIG. 8 shows an embodiment of an access control system that uses a wireless remote communication module configured for installation in a communication panel accessible to a visitor.

FIG. 4 shows an embodiment of the wireless remote communication module 136 that is configured for installation in an intercom appliance 120. The embodiment shown in FIG. 4 allows for the upgrading of an individual intercom appliance 120 without needing to make changes to any other part of the system. In comparison, FIG. 8 shows a system that uses a communication panel remote communication module 137 instead of the wireless communication module embodiments shown previously. Comparing the system of FIG. 1 and FIG. 4 with the system of FIG. 8, the following elements are similar in their function and placement:

(a) The existing intercom system including the external communication panel 110, the upper dwelling intercom 120B, the lower dwelling intercom 120A, the remotely controllable door strike, and the intercom system wiring 150;

(b) The internet elements including the internet gateway 172, the MQTT server 174, the cloud control server 176, and the cloud database 178; and (c) The mobile phone, the smart watch 184, and the computer 186.

In the configuration shown in FIG. 8, the remote communication module 137 is configured for installation into the external communication panel 110, instead of into the intercom appliance (as was shown in FIG. 4). This panel remote communication module 137 can then be configured to communicate with the remote person 16 via cellphone signals 168 and a cellphone network 258 or via WiFi (or other internet) signals 162 to a WiFi modem (or other type of modem) 160 to the internet 170. The panel remote communication module 137 can have any or all of the functionality and configurations that were illustrated and described in reference to FIG. 5 to FIG. 8. The system can interact with a visitor 14 in the same ways as was described with reference to FIG. 1 through FIG. 7.

4. Electronic Smart Lock

Figure 9:
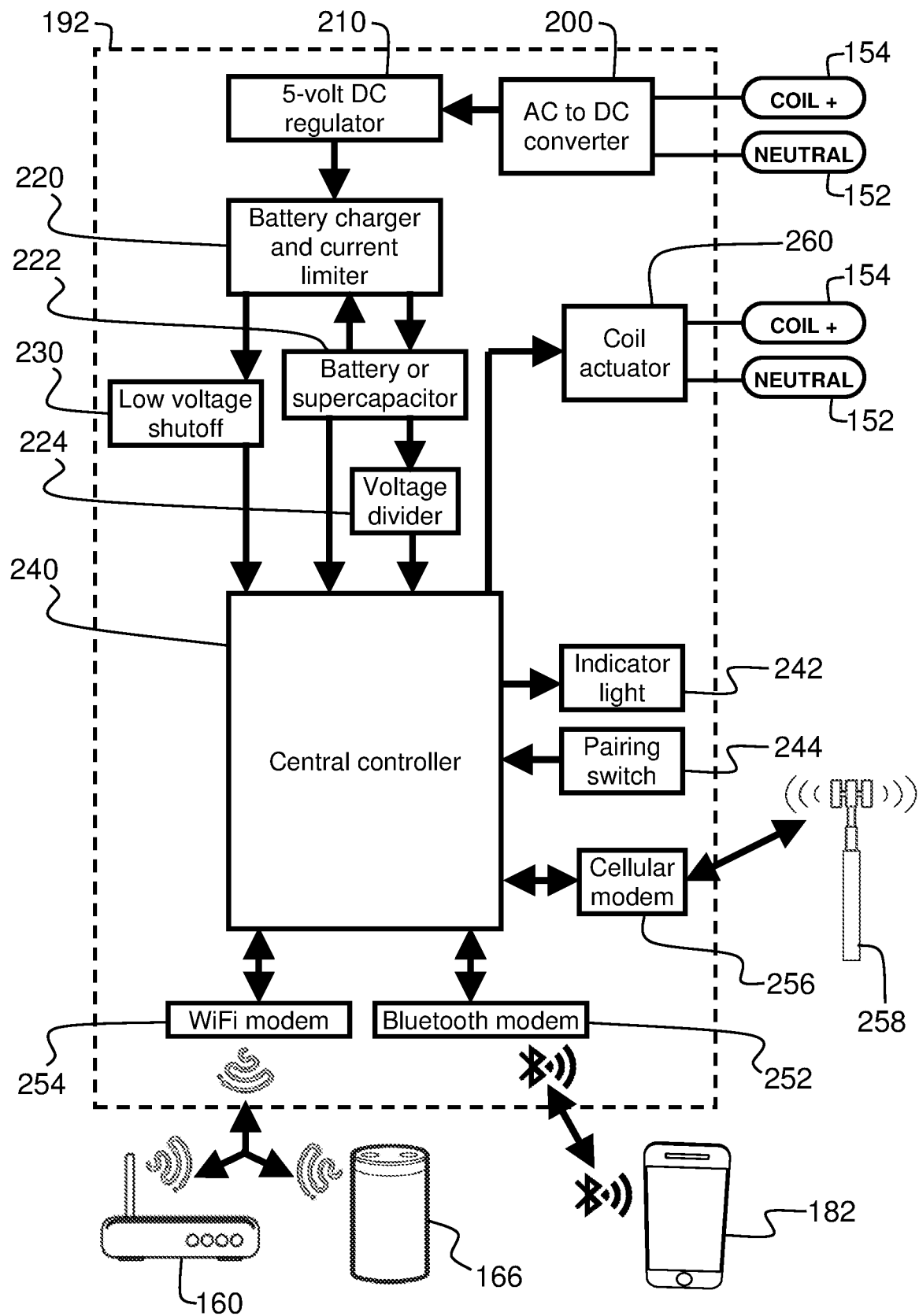
FIG. 9 shows a simplified version of the system of FIG. 7 without the ringer circuitry and without the audio/video/text communication technology.
Figure 10:
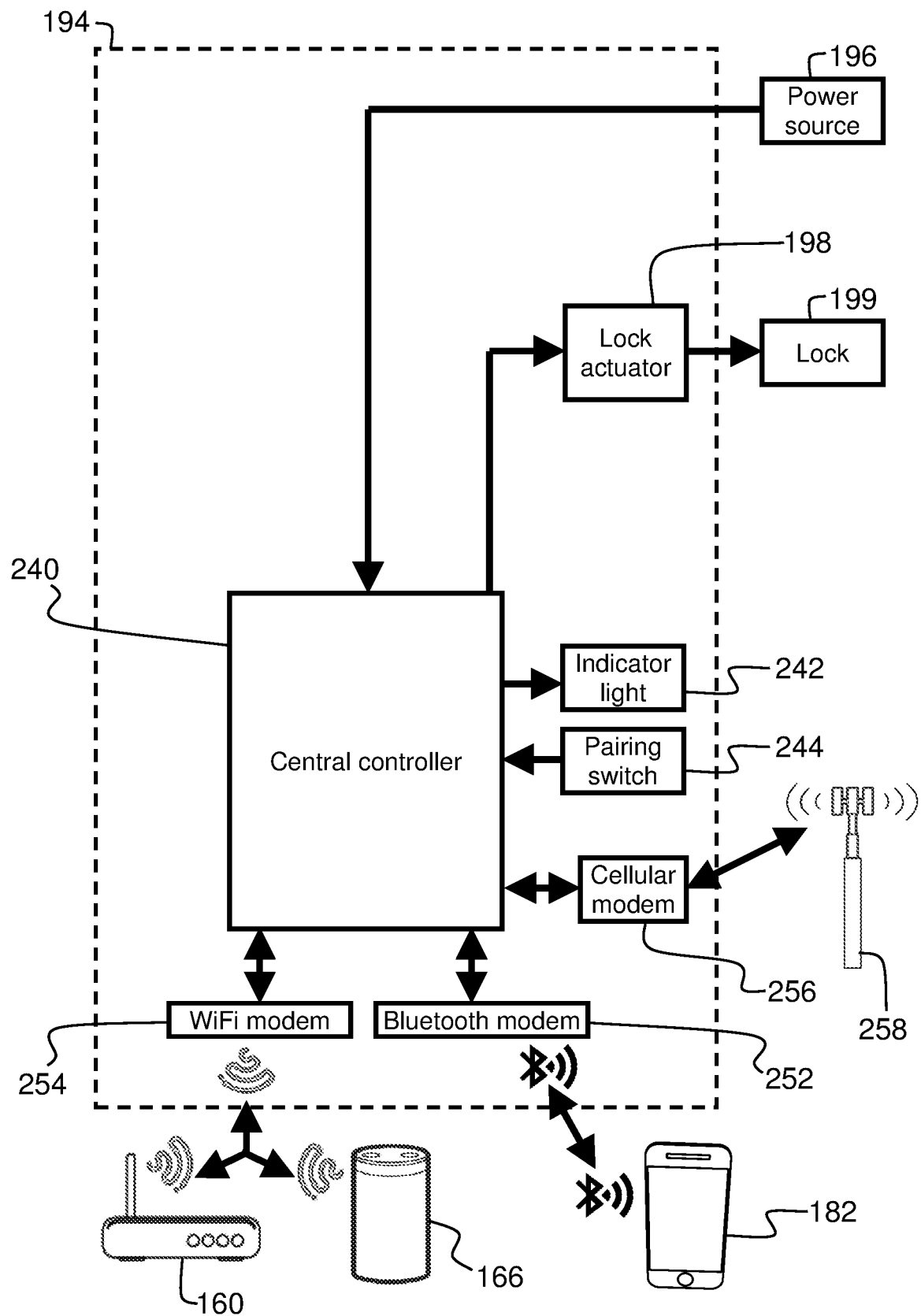
FIG. 10 shows a simplified version of the system of FIG. 9 wherein the system is used to control a remote lock.

It is also possible to place embodiments of the wireless remote communication module (136 in FIGS. 2, 3, 4, and 5) in locations other than an intercom appliance (120 in FIG. 4). FIG. 9 and FIG. 10 show simplified embodiments of the system of FIG. 5 that can be used in these other locations. More specifically:

(a) FIG. 9 shows a wireless remote door strike coil actuation module at 192; and (b) FIG. 10 shows a wireless remote lock actuation module at 194.

Referring to both FIG. 9 and FIG. 10, the door strike coil actuation module 192 and the lock actuation module 194 are similar to the wireless remote communication module 136 shown in FIG. 5, but the modules shown in FIG. 9 and FIG. 10 do not include the ringer signal isolator circuit (270 in FIG. 5) and do additionally and optionally comprise a cellular modem, shown at 256. The cellular modem 256 is configured to communicate with a cell phone network, shown at 258. The modules 192 and 194 shown in FIG. 9 and FIG. 10 can be configured to be installed in locations where a ringer signal isolator circuit (270 in FIG. 5) is not necessary. For example, these modules could be configured to be installed in any of the following types of locations:

(a) Proximate to the front door of a multi-unit building;

(b) Proximate to the entrance of a single-unit residence, apartment, or office;

(c) Proximate to any other item to be locked, such as a postal box, a truck container, and/or a storage locker.

Further referring to both FIG. 9 and FIG. 10, the cellular modem 256 and connection to a cell phone network can be used as an alternative or in addition to the Bluetooth modem 252 and the WiFi modem 254 to send and/or receive voice communications, lock and unlock instructions, and/or lock and unlock codes.

Comparing FIG. 9 and FIG. 10, the lock actuation module (194 in FIG. 10) does not include the circuitry for harvesting energy from the coil circuit (200, 210, 220, 222, 224, and 230) that were shown in FIG. 9 and instead, the lock actuation module shown in FIG. 10 could be powered by any controller power source 196, such as a 5-volt direct current (5VDC) supply. The lock actuation module (194 in FIG. 10) is designed for any electromechanically operable lock, shown at 199, through a lock actuator circuit, shown at 198. Examples of electromechanically operable locks can include magnetic locks, electric cylindrical locks, mortise locks, card-reader locks, keypad locks, and any other lock that is responsive to an electrical or electromagnetic signal.

5. Gateway

The embodiments of the module shown in FIG. 5, FIG. 6, FIG. 7, FIG. 9, and FIG. 10 all include connectivity via both Bluetooth and WiFi (and/or cellular). Due to the high power requirements of WiFi, it may be desirable to have a module with the functionalities described herein that does not have WiFi. In that case, a separate gateway that translates Bluetooth signals to WiFi signals and vice-versa might be needed as part of the system.

Alternatively, the modules shown in FIG. 5, FIG. 6, FIG. 7, FIG. 9, and FIG. 10 could additionally, or exclusively, serve as a gateway to connect Bluetooth devices (such as other low-power IoT device) to the internet.

6. Autonomous Unlocking Controller

Figure 11:
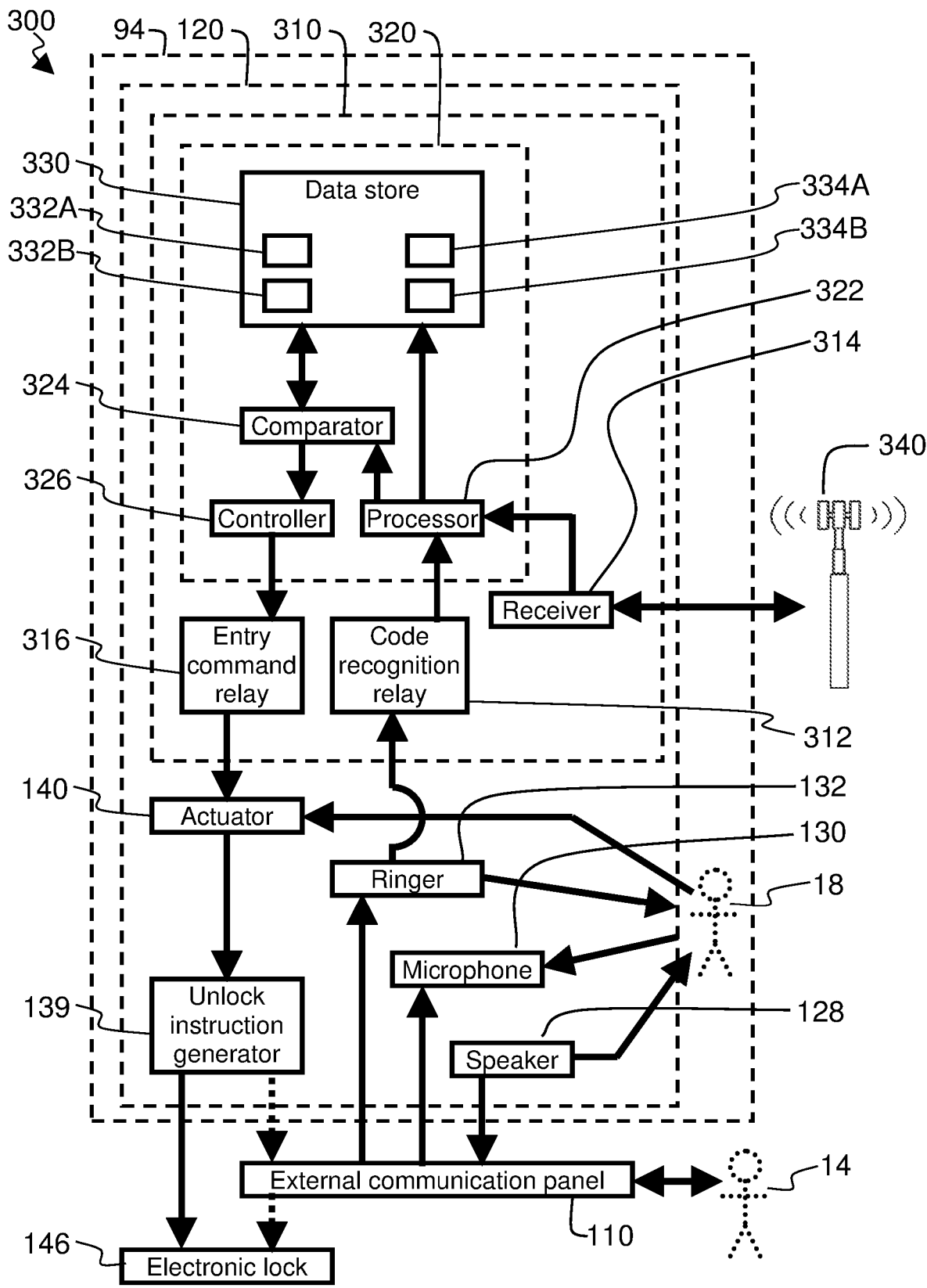
FIG. 11 shows an autonomous unlocking controller configuration that can be part of embodiments of the invention.

As part of the use scenarios described herein, it might be desirable to provide access to a visitor of a multi-unit premises without needing real-time interaction with a person who has access control permission to the premises. The autonomous unlocking controller configuration shown at 300 in FIG. 11 can be used as part of embodiments of the invention to provide this visitor access. In the configuration shown in FIG. 11, the electronic lock 146 is a more generalized version of the remotely-controllable door strike 140 that was shown previously with reference to FIG. 1, FIG. 2, and FIG. 4. The electronic lock 146 could be any electronically controlled lock capable of being understood by any skilled in the art, including but not limited to, the electronic door strike 140 described previously. FIG. 11 shows a visitor 14 who is interacting with the external communication panel 110 of the autonomously unlockable entry controller 300. The external communication panel 110 has been described in greater detail previously. If the dwelling (or office or similar) 94 has an occupant, shown at 18, the system can be used like a conventional intercom access system, as described previously. In this case, the visitor 14 would interact with the occupant 18 through the external communication panel 110 that is connected to the intercom appliance 120 in the dwelling (or office or similar) 94. More specifically, this communication would be via the intercom ringer (or buzzer) 132, the intercom microphone 130, and the intercom speaker 128. The occupant 18 would interact with an actuator 138, which would signal to an unlock instruction generator 139 in the intercom appliance 120, which in turn would either directly signal the electronic lock 146 or do so indirectly via the external communication panel 110. In either case, the electronic lock 146 would go into an unlocked state. The actuator 138 and unlock instruction generator 139 shown in FIG. 11 are a more generic version of the door strike coil actuator switch 134 that was previously described with reference to FIG. 2. The actuator 138 and unlock instruction generator 139 can be any device or combination of devices that perform the functions described herein, including but not limited to the door strike coil actuator switch 134 described previously.

In the case when there is no occupant 11 in the dwelling (or office, or similar) 94, the intercom-based access control system 300, that is shown in FIG. 11, further comprises an unattended entry controller 310, which provides autonomous unlocking functionality. The unattended entry controller 310 could be the same as the remote communication module 136 that was described and detailed with reference to FIG. 2 to FIG. 6. The unattended entry controller functionality could be implemented using a device that has some or all of the elements of the remote communication module 136. Referring to FIG. 11, the unattended entry controller 310 can be implemented as a retrofitted module inside the intercom appliance 120. FIG. 11 also shows a communications network 340. The communications network 340 shown in FIG. 11 could be the same as the internet configuration shown and described with reference to FIG. 4. It could more generally be any wired or wireless network capable of being understood by anyone skilled in the art, including but not limited to a mobile phone network or the internet.

Referring more generally to FIG. 11 and the use of an unattended entry controller, external sources from which the external communication panel 110 may receive input can comprise the visitor 14 who is trying to obtain access to the location. In order to provide this input, the visitor 14 may be provided with any suitable communications device so that input may be sent via the communications network 340. This may, by way of illustrative example, comprise a mobile telecommunications device which is provided with suitable software to enable this communication. It may additionally comprise a stationary device provided with suitable software, such as a personal computer. The external sources may further comprise the occupant of the residence 18, where communication is enabled by any suitable communications device being provided to the occupant of the residence, such as the mobile telecommunications device described above. It is to be appreciated that the two external sources described above are illustrative examples, and that further external sources may additionally be permitted to communicate with the intercom appliance 120, via the communications network 340 and a suitable communications device. In the embodiment described, this communications network 340 is configured to provide a wireless communications method via known methods, however it is to be appreciated that suitable modification may be made to the system 300 such that this communication may be enabled by known wired means. The nature of the input will be further described below. In an embodiment of the present centralized access control system with autonomous unlocking functionality described above, there is provided a system by which access to the location by a visitor 14 is enabled upon determination of entry of a predetermined code pattern into the system 340. More specifically, the code pattern is entered via temporal interaction with an interface button, such as a call button (116, 116A, or 116B) on the external communication panel 110 as was described previously with reference to FIG. 2. Once it is determined that a code pattern has been entered that matches the predetermined code pattern, the system is configured 340 to disengage the electronic lock 146, thereby permitting access to the visitor 14. The method by which this is achieved is described in greater detail below. It is to be appreciated that there may be a plurality of predetermined codes which may be entered by a visitor 14 which permit access to the location. Furthermore, the system 340 may be adapted such that any suitable form of code entry device may be used, and that the form of the code pattern may be adapted in concurrence with the code entry method. The predetermined codes may be configured such they are supplied upon installation of the centralized access control system 340 and are unmodifiable. Alternatively, the list of predetermined codes may be configured such that they are amendable, such that more codes may be added or that existing codes may be modified or removed. As an example, the system 300 could be configured so the visitor inputs a Morse code of his/her name into the call button 116 to open the door of a building or building complex.

In another embodiment of the present centralized access control system 300 described above, there is provided a system by which access to the location by a visitor 14 is enabled upon a suitable input being sent from the visitor 14 directly to the intercom appliance 120 requesting access to the location, where the system 300 has previously been configured to allow access to this user 14 upon receipt of the input. This input may be achieved by a signal being sent wirelessly from a suitably configured communications device which identifies the user 14 to the intercom appliance 120. The configuration of the system 300 to allow access to this user may comprise the occupant of the residence 18 specifying that the visitor 14 is to be allowed access upon request. Such specification may be achieved by a signal being sent wirelessly from a suitably configured communications device which enables the occupant of the residence 18 to alter the settings of the intercom appliance 120 such that access rights are granted to the visitor 14. It is to be understood that throughout the following description, references to the occupant of the residence 18 are given purely as examples of a user who may be afforded the ability to assign access rights, and that any suitable person may be afforded these privileges. The above embodiments provide a system by which an visitor 14 is able to access the location without requiring that the occupant of the residence be present within the residence. This allows for known visitors 14 who should be allowed such access to enter the location when necessary. Additionally, due to the nature of the modifications, the advantages which are present in the known systems are retained in the present system, since all of the functionality remains intact. Namely, this allows for access to be permitted to known visitors 14, whilst still requiring explicit verification from unknown visitors and without requiring that existing systems be removed and replaced with alternative and more expensive solutions. The centralized access control system 300 may be configured to be powered by any suitable means, such as a battery pack or through being attached to a power supply. Alternatively, the system 300 may also draw power directly from pre-existing system architecture as has been described previously.

Continuing with the details of the embodiment of the autonomous system 300 in FIG. 11, the unattended entry controller 310 can be a simple unit which needs to be retrofitted to an existing intercom appliance 120 to attain the benefits of the current embodiment. The unattended entry controller 310 can be configured to determine whether entry is to be permitted to a visitor 14, without any further input being required from the occupant of the residence 18. The unattended entry controller 310 can be communicably coupled to the intercom ringer 132 such that upon the ringer (or buzzer) 132 being activated, a notification signal is sent to the unattended entry controller 310. This notification signal may be configured to be sent every time the ringer 132 is activated. The notification signal may further be configured to provide information to the unattended entry controller 310 regarding when the ringer 132 is activated, and the length of time that it is activated for. This notification signal may be used to determine whether access is to be permitted to the visitor 14. This determination will be described in further detail later in this document. The unattended entry controller 310 is additionally communicably coupled to the communications network 340 and is configured to receive suitable input from external sources via the communications network 340 in accordance with embodiments described above. This input may be used to determine whether access is to be permitted to the visitor 14. The nature of the input will be described in greater detail later in this document. The unattended entry controller 310 is further communicably coupled to an actuator 140 within the intercom appliance 120. The actuator 140 is configured to receive a notification signal from the unattended entry controller 310 upon determination by the unattended entry controller 310 that and visitor 14 is to be permitted access to the location, in accordance with the embodiments described above. Upon receipt of the notification signal, the actuator 138 is configured to send a signal to the unlock instruction generator 139 indicating that the electronic lock 146 is to be disengaged. The actuator 140 of the present system is additionally configured to receive direct input from the occupant of the residence 18, as previously described.

Turning now to more details of one implementation of the unattended entry controller 310 in FIG. 11, a code recognition relay 312 is communicably coupled to the ringer 132. The code recognition relay 312 is configured to switch from an off position to an on position upon sensing that the ringer 132 has been activated. The result of this is that an electric signal is generated by the relay 312 which can be used to interpret when the ringer 132 has been activated. Furthermore, the length of time that the electric signal is generated for can be used to determine how long the call button (116 in FIG. 2) has been depressed. The result of this is that, through an analysis of the generated electric signal over a predetermined period of time, a profile can be generated regarding the number of times the ringer 132 has been activated, and how long it has been asserted for with each activation. This form of pattern analysis may be used as a binary code recognition mechanism, wherein each time period of assertment of the ringer 132 is viewed as a '1,' and each time period where the buzzer 30 is not asserted is viewed as a '0.' An applicable code form for which this mechanism may in one embodiment operate is Morse Code, 14 where a 'dot' may be represented by an assertion which is less than a predetermined period of time, and a dash may be represented by an assertion which is greater than a predetermined period of time. It is to be understood that the equivalence of an assertion as being equivalent to a '1' and nonassertion being equivalent to a '0' may be reversed. In further embodiments, the code recognition relay 312 may be replaced by any suitable component which allows for a determination of how often the ringer 132 has been asserted, such as a microphone which is able to determine via audio identification when the ringer 132 has been activated, and generate an electric signal in dependence upon this determination. The code recognition relay 312 is additionally communicably coupled to an entry microcontroller board 320. The entry microcontroller board 320 is configured to analyze the electric signals generated by the code recognition relay 312, in order to associate the signals with a binary code which has been entered via assertion of the ringer 132, in accordance with any of the embodiments described above. Further, the entry microcontroller board 320 is configured to compare the binary code associated with the electric signals with one or more predetermined binary code patterns. The one or more predetermined binary code patterns are code patterns which are used by the entry microcontroller board 320 to enable access to the location if they match the code pattern associated with the electric signals generated by the code recognition relay 312. Typically, these predetermined binary code patterns will be stored on the entry microcontroller board 320 and will be provided to the entry microcontroller board 320 at a point in time prior to the attempted access by the visitor 14. To that end, the entry microcontroller board 320 is additionally communicably coupled to a receiver 314. The receiver 314 is configured to receive communications from external sources via the communications network 340 in accordance with embodiments described above. In particular, the communications which are received may comprise a signal sent wirelessly from a suitably configured communications device of the occupant of the residence 18 where the signal is configured to alter the settings of the intercom appliance 120. The communications may also comprise the receipt of a signal from a visitor 14 requesting access to the location, in accordance with embodiments described above.

In an embodiment in which predetermined codes are used to grant access rights, the altering of settings may comprise the occupant of the residence 18 amending, appending or removing predetermined binary code patterns which are stored on the code recognition relay 312, to change, add or remove codes which enable access rights for a visitor 14 as required. In an embodiment in which a visitor 14 sends a signal requesting access to the location, the altering of settings may comprise the occupant of the residence 18 amending, appending or removing access rights associated with a particular visitor 14 as required. The settings in this embodiment may also include a means of identifying the visitor 14, such as a username or a mobile identification number (MIN) which is associated with the device that the visitor 14 will request access from. In certain embodiments, a particular predetermined binary code may be associated with a specific visitor 14 and the code which is to be used may be specified by the visitor 14. In such embodiments, the receiver 314 may first be configured to receive a communication from the occupant of the residence 18 indicating that a visitor 14 is to be granted access rights, in accordance with embodiments described above. In these embodiments, once this message is received, it may be passed to the entry microcontroller board 320 which determines that the visitor 14 now needs to provide a code to be associated with them. In such embodiments, the unattended entry controller 310 is further provided with a transmitter, which is configured to transmit a message via the communications network 340 to the visitor 14 notifying them that they must provide an access code, via a suitable software application. Upon receipt of this message, the visitor 14 may then provide such a code, which is transmitted to the receiver 314 via the communications network 74. This code will then be passed to the entry microcontroller board 310 where the code is stored, in accordance with embodiments described previously.

Further referring to FIG. 11, the entry microcontroller board 320 is also communicably coupled with an entry command relay 316. The entry command relay 316 is additionally communicably coupled to the actuator 140 and is configured to activate the actuator 140 upon receipt of a signal from the entry microcontroller board 320 upon determination that the visitor 14 is to be permitted access to the location (according to any of the embodiments previously described). In further embodiments, the entry command relay 316 may be replaced by any suitable component which allows the actuator 140 to be activated upon determination by the entry microcontroller board 320 that the visitor is to be permitted access to the location. In alternate embodiments, the entry microcontroller board 320 may also be adapted to provide an activation signal directly to the actuator 140 without the need for any intermediary components.

The composition of the entry microcontroller board 320 of the unattended entry controller 310 is also shown in FIG. 11. The entry microcontroller board 320 comprises an entry microcontroller board processor 322 which is configured to receive input from the receiver 314 and electrical signals from the code recognition relay 312, where the input may be any input as described above. The processor 322 is configured to process the electrical signals received from the code recognition relay 312 so that the signals may be interpreted as a code which has been input by a visitor 14. Following this, the processed information is then passed to an entry microcontroller board comparator 324 which is communicably coupled to the processor 322. The processor 322 is also configured to process input received from the receiver 314 to determine its nature and/or its origin before further determining what action needs to be taken in determination upon this information. If the processor 322 determines that the input relates to amending the settings of the entry microcontroller board 320 as described above, the required alterations are determined by the processor 322 and are passed to an entry microcontroller data store 330 which is coupled to the processor 322. The data store 330 is configured to store any predetermined binary codes, 332A and 332B, which are deemed to allow access to the location. The data store 330 is additionally configured to store information relating to visitors 14 who have access rights, 334A and 334B, to the location in addition to identification information which may allow the visitor 14 to be identified by their request, such as a username or MIN. If the processor 322 instead determines it has received input from the receiver which relates to a visitor 14 requesting access, then the request is processed to identify any necessary information, before this information is passed to the comparator 324. Such information may comprise the origin of the request, and/or an identifier of the requestor. The comparator 324 is configured to compare information which has been received from the processor relating to a request for access with information relating to visitors 14 who are permitted access to the location and/or codes which grant access to the location. To that end, the comparator 324 is also coupled to the data store 330, and upon receipt of a request, will request relevant information be retrieved from the data store 330. This request may comprise requisitioning all available information. Alternatively, it may comprise requisitioning a subset of the contained data which is most relevant to the request. For example, if the request is in the form of an entered code, the comparator 324 may only requisition from the data store 330, information pertaining to predetermined binary access codes. Similarly, if the request relates to a direct request made by a visitor 14, the comparator 324 may only requisition from the data store 330 information pertaining to a list of visitors 14 who are permitted access and their corresponding identifiers. The comparator 324 will compare information which has been received from the processor 322 with the relevant information retrieved from the data store 330 to determine whether a match can be made. If it cannot, then no further action will be taken by the comparator 324. If a match is found, then the comparator 324 is configured to send a signal to a controller 326 to which it is communicably coupled. The controller 325 is further communicably coupled to the entry command relay 316, and upon receipt of a suitably configured signal from the comparator 324, will send a control signal to the entry command relay 316, thereby engaging the relay in accordance with embodiments described above.

In further embodiments, a notification system (not shown) may also be provided, wherein if the comparator 324 determines that a match cannot be made, the notification system notifies the visitor 14. This may comprise sending a notification to the mobile telecommunications device of the visitor 14. Alternatively, this may comprise sending a pre-recorded audio notification to the external communication panel 110 which generates audio output for the visitor 14. In such an embodiment, upon determination that a match cannot be made, the comparator 324 may send a suitably configured signal to the controller 326, indicating this result. The controller 326 may then be configured to instruct the notification system to distribute the notification in whichever format is applicable.

Referring more generally to the system shown in FIG. 11, the system shown facilitates a method of access control that uses an adapter unit retrofitted into an existing access control system, the method comprising:
(a) receiving an access request signal at the retrofitted adapter unit;
(b) converting the access request signal into a binary code;
(c) comparing the binary code against a plurality of stored binary codes; and
(d) if there is a match between the binary code and any of the plurality of stored binary codes, instructing the user control module to generate the control signal to unlock the remotely-located door.

Figure 12:
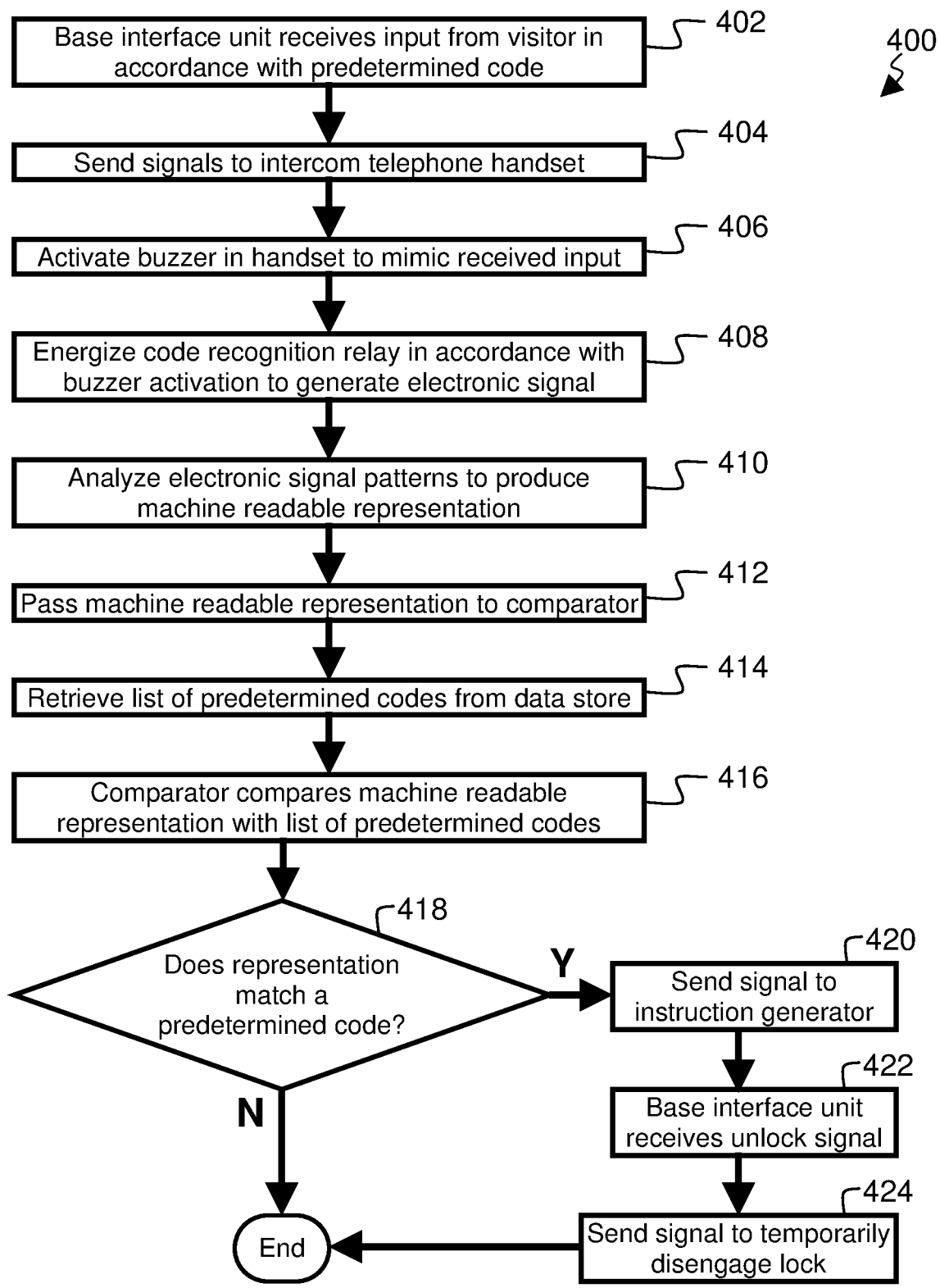
FIG. 12 shows a method for receiving and matching a predetermined code as part of the unattended entry controller configuration shown in FIG. 11.

FIG. 12 shows a method for receiving and matching a predetermined code in the unattended entry controller at 400. This method can be used to operate the system that was shown at 300 in FIG. 11. The code matching method 400 in FIG. 1 relates to an embodiment in which a visitor, 14 in FIG. 11, inputs a code pattern in accordance with a predetermined binary code pattern in order to gain access to the location. The code matching method 400 begins when the base interface unit, or external communication panel, 110 in FIG. 11, receives, at Step 402, input from the visitor 14 which is representative of a predetermined binary code. This input may be provided by the visitor 14 interacting with an interface button on the base interface unit 110, where the frequency and duration of each interaction and the length of time between interactions is designed to mimic a pattern which has previously been designated as allowing access to the location. As the signals are input by the visitor 14, they are then sent, at Step 404, from the base interface unit 110 to the intercom telephone handset, 120 in FIG. 3. In some embodiments the signals are sent as soon as input is received by the base interface unit 110. In other embodiments, the system is configured to wait for a predetermined period of time before a signal representing all of the inputs received by the base interface unit 110 are sent in a single batch. In this way, a visitor 14 may input a full input pattern before the signal is sent. Once the signal or signals are received by the intercom telephone handset 120, the buzzer (or ringer), 132 in FIG. 11, is configured to engage, at Step 406, in a way which mimics the input pattern received by the base interface unit 110. For example, the signals and the buzzer 132 may be configured so that the buzzer is activated for the same length and duration of each of the interactions received by the base interface unit 110, with the buzzer 132 being deactivated in the intermediary time corresponding to the periods in which there is no interaction with the base interface unit 110. As the buzzer 132 engages, the code recognition relay 312 is configured to activate, at Step 408, in accordance to the buzzer activation pattern described above. In such an embodiment, when the buzzer 132 engages, the code recognition relay 312 is configured to close and in doing so, completes a circuit to which it is coupled and an electrical signal is generated. Similarly, when the buzzer 132 is not activated, the code recognition relay 312 is configured to be open, thereby leaving an incomplete circuit and so either no signal is generated, or alternatively only a low signal is generated in comparison to when the code recognition relay 312 is closed. In order to achieve the required functionality, all that is required is that there is a clear distinction in the electrical signals produced when the buzzer 132 is activated and when it is deactivated. As such, any component may be used in place of the code recognition relay 312 so long as it enables the above functionality.

The electrical signals produced by the code recognition relay 312 are then passed to the processor, 322 in FIG. 18, which proceeds to analyze, at Step 410, the electrical signals in order to produce a machine-readable representation of the code pattern which has been entered. This representation may comprise a binary format, where an engagement of the buzzer is represented by a '1,' and a buzzer disengagement is represented by a '0,' as described above. An example illustrating one possible method for producing this representation is described below, with reference to FIG. 14. Once this representation has been produced, the processor then passes, at Step 412, this representation to the comparator, 324 in FIG. 11. Upon receipt of the code pattern representation, the comparator 324 then retrieves, at Step 414, the list of predetermined binary codes from the data store, 330 in FIG. 11. The comparator 324 may be configured to retrieve all of the predetermined binary codes. Alternatively, the comparator 324 may be configured to only retrieve a subset of these codes, in dependence upon their relevance to the presented code pattern. By way of example, if the presented code pattern comprises a pattern which is in total 10 seconds long, the comparator 324 may only retrieve predetermined binary code patterns which are 9-11 seconds long, as they will be the most likely predetermined binary codes which will match the presented code. Once the predetermined binary codes have been retrieved from the data store 330, the comparator 324 then proceeds to compare, at Step 416, the presented code pattern with the retrieved list of predetermined binary code patterns. This may be achieved by known computerized comparative methods of comparing signals and patterns. Once the presented code pattern is compared with codes retrieved from the data store 330, the comparator then determines, at Step 418, whether the presented code pattern matches any of the retrieved codes. If it is determined that it does not, then the method 440 concludes and no further action is taken. In this case, the entrant is refused entry. In certain embodiments where there is provided a notification system as described above, if it is determined that there is no match, then the method may be amended such that rather than ending upon determination of a mismatch, instead the notification system of these embodiments is configured to send a notification to the visitor 14 informing them that they have been refused access and that they should retry entering their code pattern.

Returning to Step 418, if it is determined that there is a match between the presented code pattern and a code in the list of retrieved codes, then the controller, 326 in FIG. 11, proceeds to send a control signal to engage, at Step 420, the actuator, 140 in FIG. 11, in accordance with embodiments described above. The system, 300 in FIG. 11, then proceeds to follow the methodology of known systems, where the actuator sends a signal to the instruction generator, as at Steps 420, 422, and 424.

Figure 13:
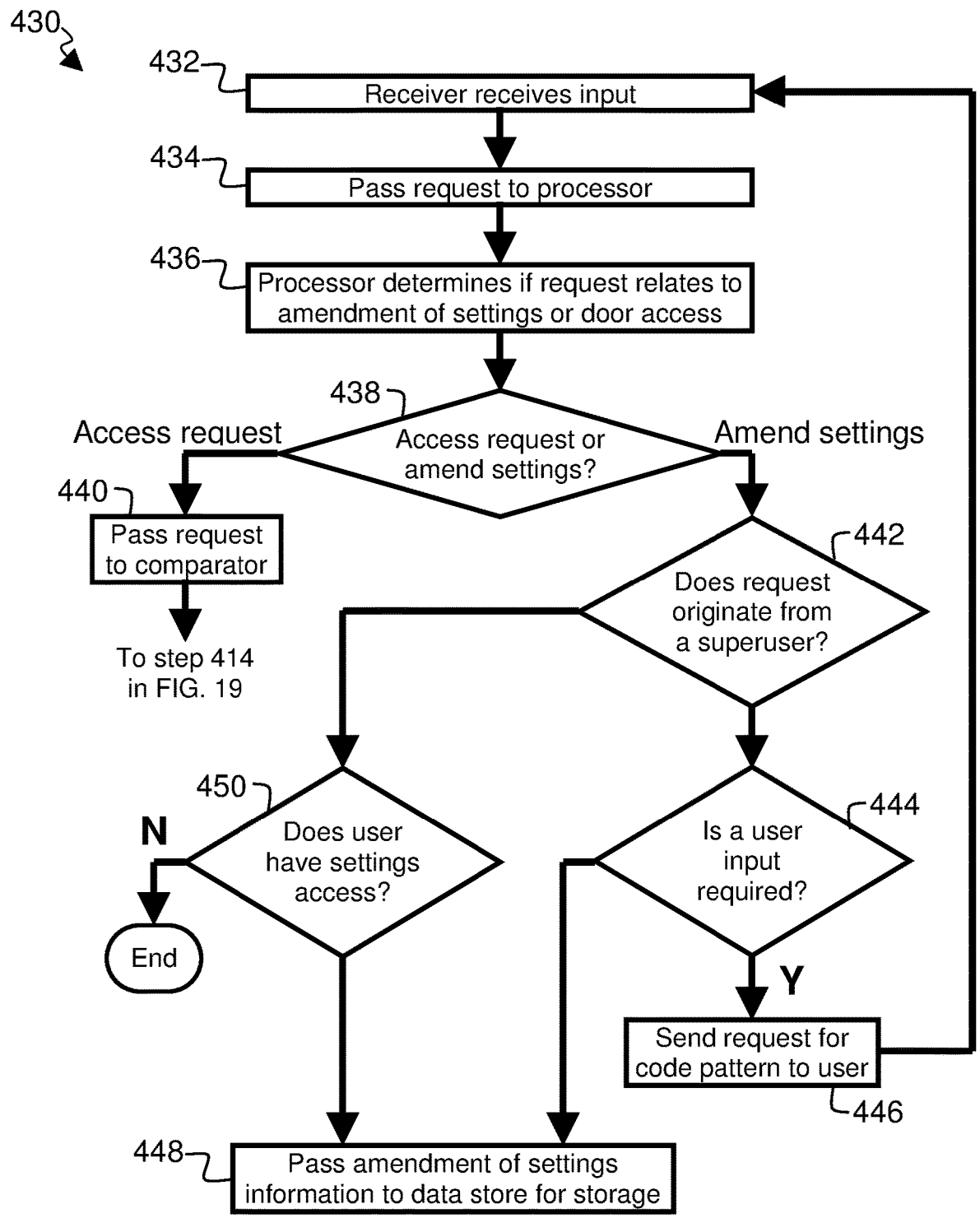
FIG. 13 shows a method for generating a predetermined code to be used by the unattended entry controller configuration shown in FIG. 11.

FIG. 13 shows a method for generating a predetermined code to be used by the unattended entry controller, 300 in FIG. 11. Put another way, this illustrates how a centralized access control system such as the system shown in FIG. 1, FIG. 2, FIG. 4 and/or FIG. 8 can process requests which it receives via the receiver, 314 in FIG. 11. These requests may comprise requests to amend the settings (a programming signal), or direct requests for access to the location using an appropriately configured communications device (an access request signal). Requests to amend the settings may comprise adding, removing or changing predetermined binary access codes which permit access to the location in accordance with embodiments previously described. Alternatively, this may comprise amending, appending or removing access rights associated with a particular visitor, 14 in FIG. 11, as required in accordance with previously described embodiments. The method 430 begins when the receiver 314 receives, at Step 432, a request via the communications network, 340 in FIG. 11. This may be achieved using software installed on a suitable communications device, in accordance with embodiments described above. Upon receipt of this information, the receiver 314 passes, at Step 434, the request to the processor, 322 in FIG. 11. Following receipt of the information, the processor 322 then determines, at Step 336, whether the request relates to a request to amend the settings of the unattended entry controller 300, or whether it is a direct request for access to the location. This may be achieved, for example, by identification of a particular form of data which indicates the type of request, where the form of the data is a distinguishing feature which provides a distinction between the forms of request which may be received by the receiver 314 and processor 322. The processor 322 then queries, at Step 338, whether the request relates to the amendment of the settings of the unattended entry controller 300. If it is determined that it does not, the request is necessarily assumed to be a request for direct access to the location. If this is the case, then the request is passed, at Step 440 to the comparator. The method proceeds to Step 414 of the method of FIG. 12, where the request is to be compared to information stored in the data store, 330 in FIG. 11. It is to be appreciated that whilst the method of FIG. 12 relates to comparison of an inputted code pattern with predetermined binary code patterns, it may be simply modified to relate to a comparison of an identification of the visitor 14 who is requesting access with visitors 14 who are permitted access in accordance with settings stored in the data store 330. Returning to Step 438, if it is determined that the request relates to an amendment of settings, the method 430 then proceeds to query, at Step 442, whether the request originates from a super user. For the purposes of this description, a super user refers to any person who has rights to amend all settings relating to who may be granted access rights and any associated predetermined binary code patterns. One example of such a super user would be the occupant of the residence, 18 in FIG. 11. The identity of the originator of the request may be identified by any suitable form of identifier. This may comprise the MIN of the device that the request originates from. It may alternatively comprise the telephone number or MAC address of the device that the request originates from. In order to determine whether this person is a super user 18, the identifier may, for example, be compared to a list of identifiers stored on the data store 102 who are designated as having super user access. Super user access may be determined upon initial setup of the centralized access control system, 300 in FIG. 11, where a list of identifiers of those people who are to be granted super user access is defined. Super user access may also be amendable, where a present super user 18 may grant another user the status of super user 18. This may be achieved using the current method 430.

If it is determined that the request originates from a super user 18, the processor, 322 in FIG. 11, then queries, at Step 444, whether any further user input is required. For the purposes of this description, a user refers to any entity that is not granted super user access, but may have the ability to change a subset of settings on the unattended entry controller, namely settings which relate to their own access. One example of such a user would be the visitor 14. An example of where further user input would be required is where, a super user 18 grants access rights to the user 14, but the visitor 14 is further required to input a binary access code pattern which is assigned to them, such that it may be stored in the data store, 330 in FIG. 11, of the entry microcontroller board, 320 in FIG. 11. If it is determined that further input is required, the method 430 then proceeds to send, at Step 446, a request to the user 14 informing them that they must input a binary access code which is assigned to their profile. In order to send this signal, the system, 300 in FIG. 11, may be provided with a suitable notification system which is configured to send a message to a suitable communications device of the visitor 14, such as a smartphone provided with appropriate software. This software may also be configured to allow the visitor 14 to input a code pattern which may be replicated upon interaction with the base interface unit, 110 in FIG. 11. Following this, the user 14 will then be required to send a further request to amend the settings with this binary access code. Once this has been sent, the method 330 returns to Step 432, where the receiver receives the request. Returning to Step 444, if it is determined that no further user input is required, the request and any necessary information included within the request is then passed to and stored, at Step 448, in the data store, 330 in FIG. 11. This is then ready to be accessed at a later stage by the comparator, 324 in FIG. 11, in accordance with the method 400 of FIG. 12. The information which is included as part of the request may comprise a unique identifier of a user 14 who is to be allowed access to the location upon request. It may additionally or alternatively comprise a predetermined binary access code which, when entered, will allow a user 14 access to the location. Returning now to Step 442, if it is determined that the request does not originate from a super user 18, the method proceeds to Step 450, where the processor determines whether the request originates from a user 14 who has amendment access to the settings that they wish to change. As above, the identity of the originator of the request may be identified by any suitable form of identifier, and to determine whether they have the correct settings access, the identifier may, for example, be compared to a list of identifiers and corresponding settings access rights stored on the data store, 330 in FIG. 11. If it is determined that the user 14 does not have sufficient settings access rights in relation to their request, the method 430 ends, and no amendments to the settings will be made. If it is determined that they do have sufficient access rights, then the method proceeds to Step 448 as described above, and the request and any necessary information included within the request is then passed to and stored in the data store, 330 in FIG. 11.

In some further embodiments, the method 430 of FIG. 20 may be amended to further provide a notification to all super users 18 whenever a request is received. This may be achieved by including a further step after the receiver receives a request wherein a control message is sent to a suitably configured notification system (as previously described) upon receipt of the request, causing the notification system to transmit a message to all identified super users 18 that this request has been made. The notification may further comprise relevant information about the request, such as the identity of the requestor and what the request relates to. It is to be appreciated that this may be modified such that only a subset of super users 18 is notified when a request is received. Furthermore, it is to be appreciated that the notifications may be restricted to only be transmitted when the request is a certain type of request, for example, when a request originates from a user 14 rather than a super user 18. Additionally, or alternatively, the system, 300 in FIG. 11, may be configured to record any received requests and store a log file of all of these requests in the data store, 330 in FIG. 11. In some further embodiments, when a user 14 receives a notification that they are required to provide a predetermined binary access code input, rather than being required to input such a binary access code input, they may configure the software on their communications device to automatically provide one of a plurality of prestored binary codes which they have previously input. This prevents the user from needing to actively respond to every instance of such notifications that they are sent.

Figure 14:
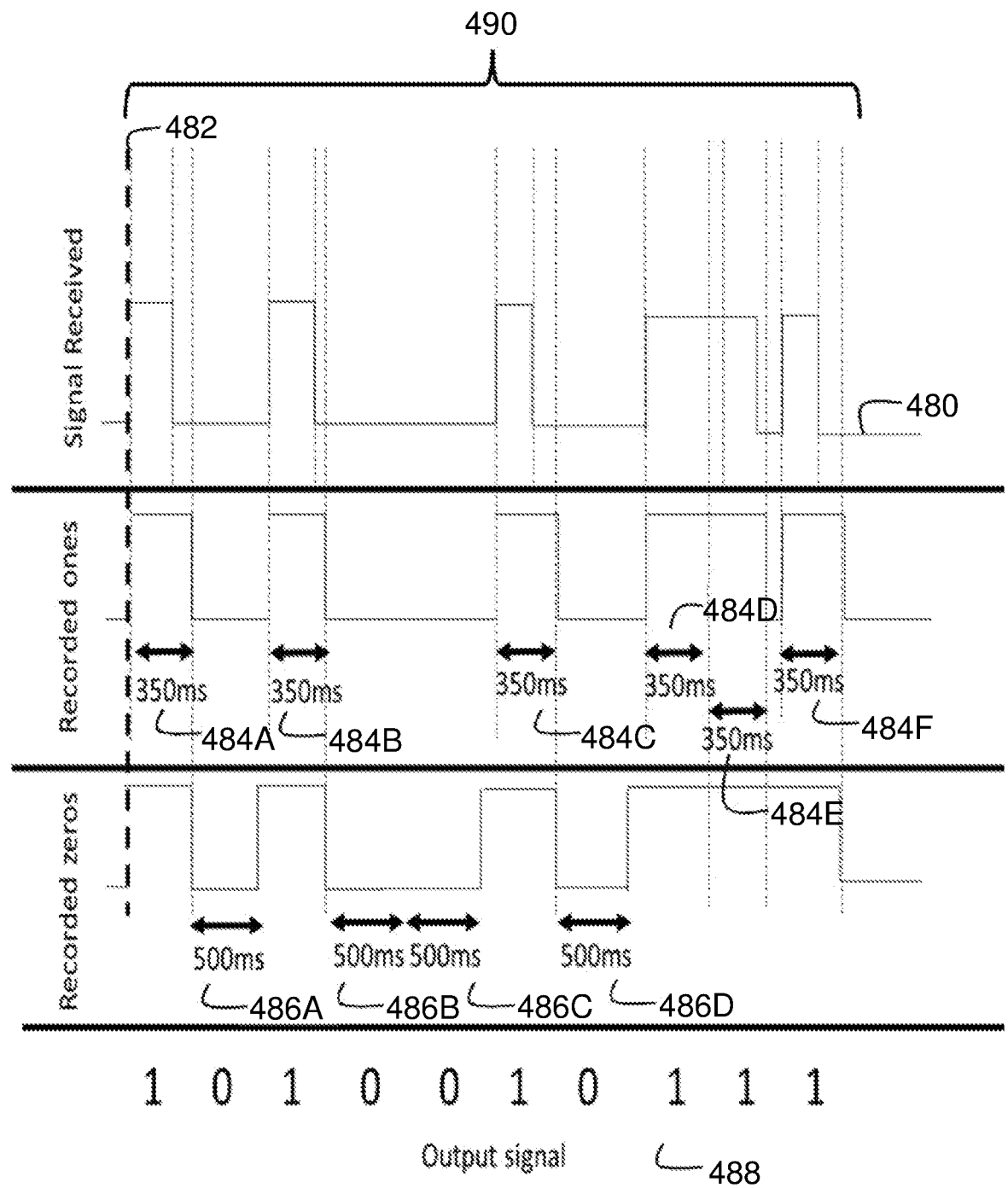
FIG. 14 shows a sample of a predetermined code that can be used by the unattended entry controller configuration of FIG. 11.

FIG. 14. Shows a sample of a predetermined code that can be used by embodiments of the present invention in the form of an illustrative diagram showing a translation between a visitor input and a representation of the how this input may be interpreted as a binary code pattern by the processor, 322 in FIG. 11, in an embodiment of the above described centralized access control system, 300 in FIG. 11. In particular, this translation involves generating a binary output signal 488 based on an input signal received by the processor, 322 in FIG. 11, where the generation of the output signal 488 involves determination of the logical state of the input signal at discrete time intervals. There is shown firstly a representation of the signal 480 received by the processor 322 from the code recognition relay, 312 in FIG. 11. It is to be appreciated that the signal displayed is assumed to be in direct correspondence with the input received from the visitor 14 by the base interface unit 110 in FIG. 11, with no loss or degradation of information between the base interface unit 110, the buzzer, 132 in FIG. 11, the code recognition relay, 312 in FIG. 11, and the processor 322. Where the signal 480 is shown to be peaking, this is to be interpreted as the code recognition relay 312 being energized and where the signal 480 is at its lowest point, this is to be interpreted as the code recognition relay 312 being de-energized. In accordance with this embodiment, it is assumed that the electric signal is configured to have only two states (high or low). In further embodiments, the system, 300 in FIG. 11, may be adapted that there are more than two states which may allow for further distinctions between visitor 14 inputs, which may be achieved for example by the pressure applied to an interface button on the base interface unit 110. As shown, the translation of the signal begins upon input first being received 482 at a time t=0. In the present embodiment, the translation of the signal 480 can only begin upon an input from the visitor 14 being received, however in separate embodiments, the system, 300 in FIG. 11, may be adapted that the translation of the signal 480 can be initiated in an alternative manner, such as by a proximity sensor detecting that a user has approached the base interface unit 110. In order to provide a mechanism which is able to translate the signal 480 into a binary code pattern, the processor, 322 in FIG. 11, is configured to define distinct time intervals 484A, 484B, 484C, 484D, 484E, 484F, 486A, 486B, 486C, 486D within which it is determined whether the buzzer (or ringer), 132 in FIG. 11, is activated or deactivated. If the buzzer 132 is determined as being activated for any period of time during these time intervals 484A, 484B, 484C, 484D, 484E, 484F, 486A, 486B, 486C, 486D then the processor 322 will interpret the buzzer 132 as being activated and will subsequently translate the signal as being equivalent to a '1.' If multiple engagement signals are received within one discrete time period 484A, 484B, 484C, 484D, 484E, 484F, 486A, 486B, 486C, 486D then the processor 322 is configured to only translate these multiple signals a single '1.' If no signal is received within a time period 484A, 484B, 484C, 484D, 484E, 484F, 486A, 486B, 486C, 486D, then the processor 322 is configured to interpret the buzzer 132 as being deactivated and will subsequently translate the signal as being equivalent to a '0.' The provision of these time intervals enables the processor 322 not only to determine that the visitor 14 has provided an input, but can distinguish a time dependency upon their inputs, so that rather than simply providing a code pattern which is dependent on the number of inputs, the visitor 14 can provide a code which additionally has a time dependent component.

To describe the above in more detail, reference is made to the specific embodiment of FIG. 14. In this embodiment, two variants of time period 484A, 484B, 484C, 484D, 484E, 484F, 486A, 486B, 486C, 486D are provided. The first variant 484A, 484B, 484C, 484D, 484E, and 484F, is the time period which is begun upon the receipt of a signal indicating the buzzer 132 is activated. If the buzzer 132 is determined to be deactivated and then reactivated within this time period, then the processor is configured to only translate this as a single '1.' Following the first variant 484A, 484B, 484C, 484D, 484E, and 484F, the second variant time period 486A, 486B, 486C, 486D begins. This is a time period which the processor is configured to wait for before recording the buzzer 132 as being deactivated and translating this as a '0.' If the buzzer 132 is activated during this time period, then a '1' is recorded rather than a '0.' As the buzzer 132 is activated, the first variant of time period, 484A, 484B, 484C, 484D, 484E, and 484F, begins. In the embodiment of FIG. 21, the first time period variant, 484A, 484B, 484C, 484D, 484E, and 484F, is configured to be 350 ms, and the second time period variant, 486A, 486B, 486C, 486D, is configured to be 500 ms. It has been determined that these two lengths of time are exemplary in allowing a time dependent component to be included within code entry, whilst also balancing this with false signal entries recorded as a result of background electrical noise. It is to be appreciated that, whilst these time periods are stated, the two may be varied, either upon installation of the system, or at a later date by an occupant of the residence, 18 in FIG. 11. This enables the code entry system to be varied in accordance with the occupant of the residence's preferences and may allow for more or less precision being required on code entry, and more or less sensitivity to background electrical noise. The processor, 322 in FIG. 11, may be configured to analyze the received signal for a predetermined period of time 490 after time t=0, and after this time period 490 has elapsed, the output signal 488 is then provided to the comparator, 324 in FIG. 11. This predetermined time period 490 provides a total window within which a visitor 14 must complete their code input. In conjunction with the distinct time intervals, 484A, 484B, 484C, 484D, 484E, 484F, 486A, 486B, 486C, and 486D, this may be used to define the total number of outputs that make up a code entry. Additionally, or alternatively, the processor 322 in FIG. 18, may be configured to cease analyzing the signal following a prolonged period of inactivity, where this period of inactivity may be predefined. This allows for the total length of the output signal code pattern to be variable, depending upon the preferences of either the visitor, 14 in FIG. 11, or the occupant of the residence, 18 in FIG. 11, in various embodiments.

The embodiment of the system shown in FIG. 11 and methods shown in FIG. 12, FIG. 13, and FIG. 14 can be a low-cost solution to the problem of providing unattended entry to general entrances of communal buildings for example. This embodiment, and others described herein, can be realized in a simple electronic module which can be readily wired to an existing user control module without the need to replace an existing door entry system. This is advantageous not only because of the low cost but also because the solution can be implemented on an individual user basis, not requiring for example the permission of other occupiers of the building who also have control of the door access at a communal entrance to a building. Other higher cost solutions which require replacement of the existing system also require the permission of all the communal occupiers of the building which can be difficult and time consuming Also, the present invention can be retrofitted to any conventional access control system because it only requires the essential components of every system, thus making it a universal solution. In some embodiments the method further comprises creating the access request signal using an intercom buzzer of the door entry system, the access request signal comprising a binary signal having an asserted level and a non-asserted level produced by temporal assertions of the intercom buzzer. The use of the intercom buzzer provides a simple way of utilizing existing communications channels of the door access system to provide a low-cost door access solution for unattended entry into the building past the locked communal entrance. Also, the buzzer system typically only has two states asserted and non-asserted. Accordingly, this very simple communications channel is utilized to create a much more sophisticated access request signal without requiring any adaptation of the existing door access control system. In some embodiments the converting step may comprise measuring the duration of an asserted or non-asserted level of the binary signal and comparing the duration with a predetermined time period to determine a current state of the binary code derived from the access request signal. This is a simple way of implementing a robust technique for creating an access control signal from temporal variation of the access request signal.

The comparing step may comprise determining if the asserted or non-asserted level of the binary signal persists for longer than the predetermined time period to determine the current state of the binary code. This feature helps to prevent noise in the access request signal from generating incorrect binary codes. Any spikes in the signals caused by noise can advantageously and effectively be filtered out using this technique. In some embodiments the predetermined time period comprises a first time period for recognizing the asserted level of the binary signal and a second time period for recognizing the non-asserted level of the binary signal, the first and second time periods being different. Different time periods for asserted and non-asserted levels (typically voltage levels in the signal) further provides resilience against external noise factors and helps to clearly distinguish between time periods associated with asserted signal levels and time periods associated with non-asserted signal levels. The method may further comprise adjusting a previously set value for the predetermined time period or the first or second time periods. The ability to adjust these time periods enables the user to customize the interaction required by a visitor to enable access. Some older users may take much longer to enter in each asserted or non-asserted digit of the access code whereas other possibly younger users may be able to enter codes much faster. The ability to vary these time periods enables different types of users to be accommodated.

The converting step may comprise measuring a time out period from the end of the last of a series of asserted levels of the binary signal and, if the time out period exceeds a predetermined time limit, considering the last asserted or non-asserted level as being the end of the binary signal. This is a simple way of determining the end of an access request signal when generated by use of an intercom buzzer. In some embodiments not described in detail herein, the creating step may comprise producing a binary signal in Morse code using temporal assertions of the buzzer. In this case the duration of an asserted level of the binary signal being longer than a predetermined period can determine one of the binary states of the binary signal, and the duration of the asserted level of the binary signal being shorter than the predetermined level can determine the other binary state of the binary signal. The method may further comprise on determining that there is no match between the binary code of the access request signal and any of the plurality of stored binary codes, generating a rejection signal and transmitting the same back to the source of the access request signal. This is helpful for users where they may make mistakes in the generation of the access request signal, such that they get positive feedback and so can be permitted to regenerate the access request signal again. This is particularly helpful where the intercom buzzer is being used to generate the access request signal.

In some embodiments the receiving step may comprise receiving the access request signal from a remote device via a wide-area communications network. Preferably, the requests may be received via the internet and possibly over a wireless link. This provides the least disruptive way of connecting the adapter unit to the outside world. In many cases the receiving step may comprise receiving the access request signal from a mobile telecommunications device, for example a smart phone. In this way an app can be used on a visitor's mobile telecommunications device to make access requests and on an occupier's device to manage the set-up of access rights in a very simple manner In some embodiments, the method may further comprise receiving a programming signal for programming the adaptor unit, the request comprising a source identifier of the source of the request, comparing the source identifier of the programming signal with a predetermined list of permitted source identifiers; and permitting access to at least one of the plurality of stored binary codes, if the source identifier matches one of the list of predetermined source identifiers. The ability to program the adapter unit enables the embodiment to be customizable by the occupier to their particular situation. It provides the advantage of being able to give temporary permissions to visitors or time-restricted permissions for example only allowing unattended access for a correct access code between the hours of 9 AM to 5 PM. The ability to withdraw permissions is also useful for example when a relationship between a visitor and an occupier change. The method may further comprise determining access rights associated with the source identifier and permitting modification of one or more of the pluralities of stored binary codes in accordance with the stored access rights associated with the source identifier. In this way an occupier (super user) may be given access rights to modify all binary codes whereas a visitor (user) may only be able to modify their own binary code. In some embodiments, the method may further comprise determining if the programming signal includes a new binary code, and if so adding the new binary code to the plurality of stored binary codes. Clearly if a binary code is provided in a programming signal it is intended to be used to populate the plurality of stored binary codes and so this action can be taken quickly without further steps being required. Conversely if the determining step concludes that the programming signal does not include a new binary code, the method can further comprise sending a request to the source of the programming signal for a new binary code if required. Advantageously the method may further comprise storing a log of each received access request signal and the action taken by the adapter unit as a result of the access request signal. This can be very useful to the super user to see activity in terms of the number and frequency of access requests and also a list of times and dates as well as identifiers of which visitors were permitted access using the adapter unit.

The method may further comprise transmitting a notification to a predetermined address on each occasion of generation of the control signal by the adapter unit. This advantageously can notify the super user (occupier) of each occasion when access is granted with them being present and can in cases of breach of the security of the system act as an alarm alert. In some embodiments the binary code may comprises a user identifier. This can act as a simplification of the information required to be stored as the binary code fulfils two functions. According to another aspect of the present invention there is provided an adapter unit for controlling a door entry system for unlocking a remotely-located door on generation of an unlock control signal, the door entry system including a user control module and a gate control module, the adapter unit being retrofittable to the user control module of the door entry system and comprising: a receiver for receiving an access request signal, a convertor for converting the access request signal into a binary code; a data store for storing a plurality of binary codes; a comparator for comparing the binary code against the plurality of stored binary codes; and a controller for receiving the output of the comparator, the controller being arranged to instruct the user control module to generate the unlock control signal to unlock the remotely-located door if there is a match between the binary code and any of the plurality of stored binary codes. In some embodiments the receiver can be arranged to receive access request signals via a communications network and via an interface to the user control module. The advantages of this have been described above.

The interface to the user control module may in some embodiments comprise a relay for converting signals generated from an intercom buzzer of the door entry system into a binary signal having an asserted level and a non-asserted level produced by temporal assertions of the intercom buzzer. The relay represents a simple low-cost electronic component for generating the binary signal. In various embodiments the adaptor unit may be provided with components which are arranged to implement any of the functionality described above in relation to the above described method. The present invention also extends to a combination of an adapter unit as described above and a door entry system comprising a user control module and a remotely-located base interface unit operatively coupled to an electronic door lock, wherein the base interface unit is arranged to unlock the electronic door lock on receipt of a control signal from the user control module. For brevity, it will be understood that features, functions and advantages of different aspects of the present invention may be combined or substituted where context allows.

7. Alternate Access Control Scenarios

Figure 15:
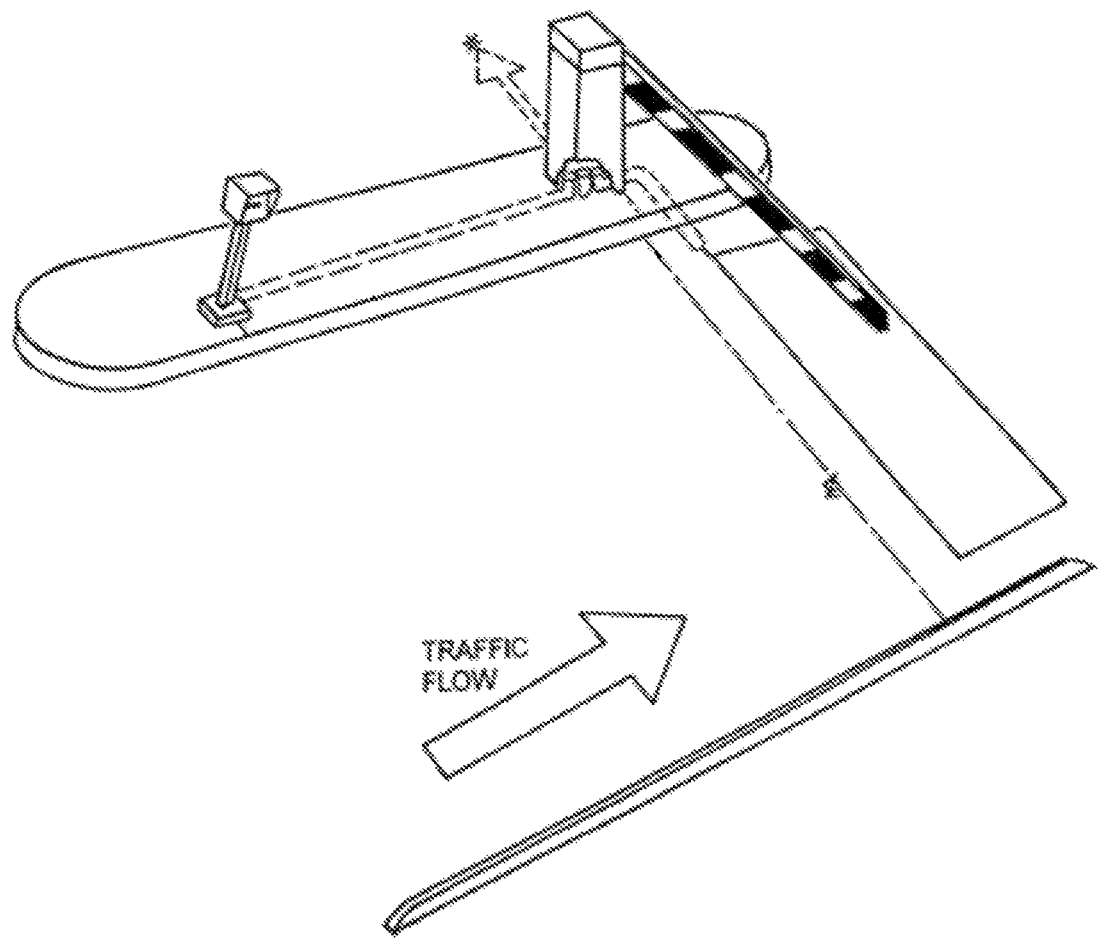
FIG. 15 shows an access control gate for a parking facility.

As noted previously, the access control systems and methods described herein can be used for more than just access control of people into buildings. For example, FIG. 15 shows an access control gate for a parking facility. In this case, the access control is not a lock, but a gate. Access is being granted to a vehicle, not necessarily to a person. It can be understood that such access control systems could also be used for residential garages, sheds, and any other physical structure capable of being understood by anyone skilled in the art.

8. Access Control for Storage Unit System

Figure 16A:
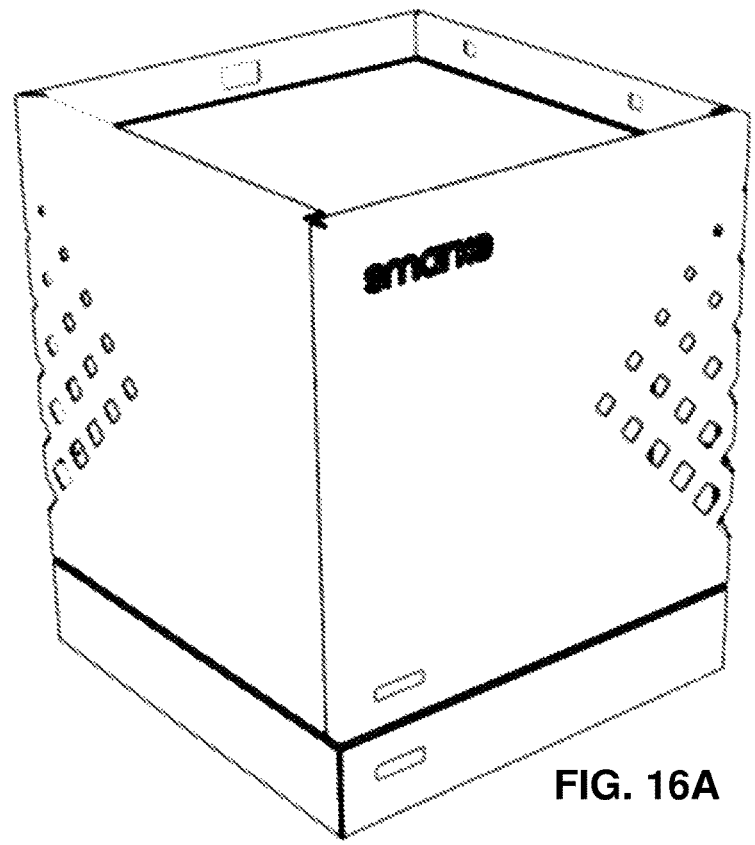
FIG. 16A shows a storage unit configured for access control.
Figure 16B:
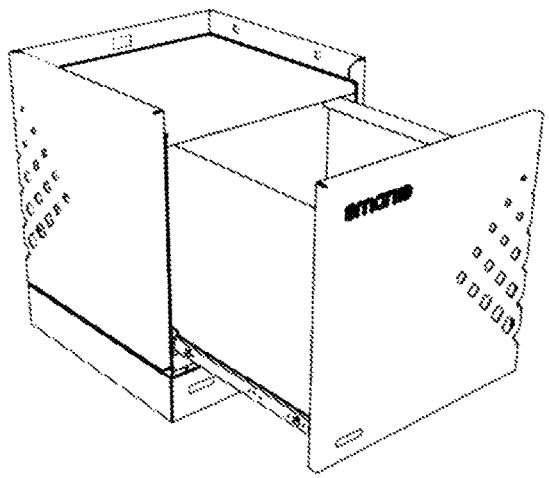
FIG. 16B shows the storage unit of FIG. 16A with a drawer for internal access.
Figure 16C:
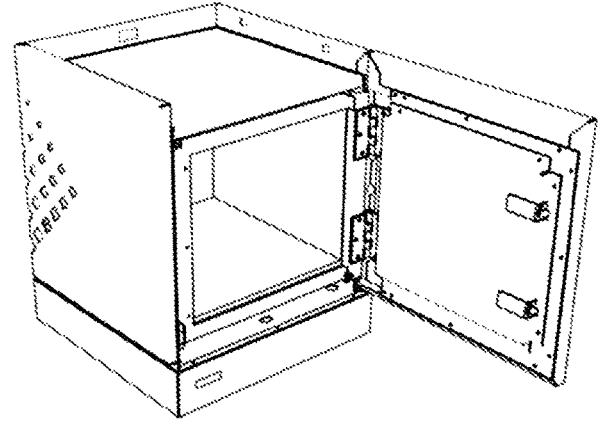
FIG. 16C shows the storage unit of FIG. 16A with a door for internal access.

The systems and methods discussed herein can have specific application to storage units that could be used for mail, packages, and other items. FIG. 16A shows an example of a storage unit configured for access control, with FIG. 16B and FIG. 16C showing two means of access to the contents of this storage unit. This storage unit could be any size or shape capable of being understood by anyone skilled in the art. The storage unit could be accessible by means of a drawer, by means of a door, by means of a mechanism that can be both a drawer and a door, and/or by means of any other physical access system or method capable of being understood by anyone skilled in the art. It can be understood that the storage unit would have electronics and a lock. It can also be understood that the function and operation of this lock and electronics can include any of the functions and elements described with reference to any of the previous illustrations herein.

Figure 17A:
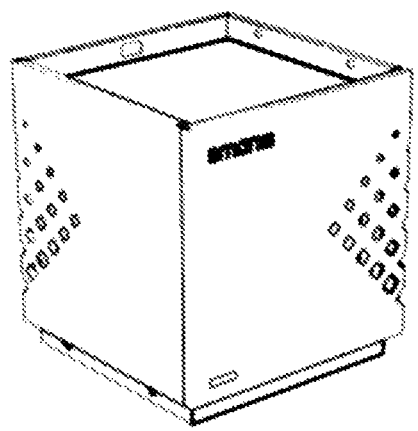
FIG. 17A shows the storage unit of FIG. 16A with a base to which this storage unit could be secured.

The storage unit shown in FIG. 16A can have two locks. A first lock can be used to control access to the contents of the storage unit. A second lock can be used to secure the storage unit to other structures. For example, FIG. 17A shows the storage unit of FIG. 16A with a base to which this storage unit could be secured. This second lock for securing the storage unit to the base can use any locking mechanism capable of being understood by anyone skilled in the art. This second lock can be controlled by electronics. The function and operation of this second lock and electronics can include any of the functions and elements described with reference to any of the previous illustrations herein. The second lock could also be located in the base instead of the storage unit.

Figure 17B:
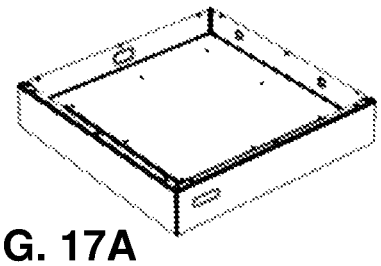
FIG. 17B shows two storage units of the type illustrated in FIG. 16A secured to each other and to the secure base shown in FIG. 17A.
Figure 17B:
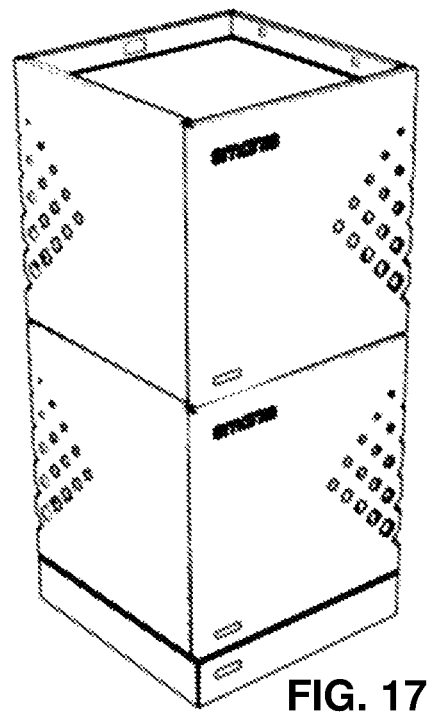
Figure 17C:
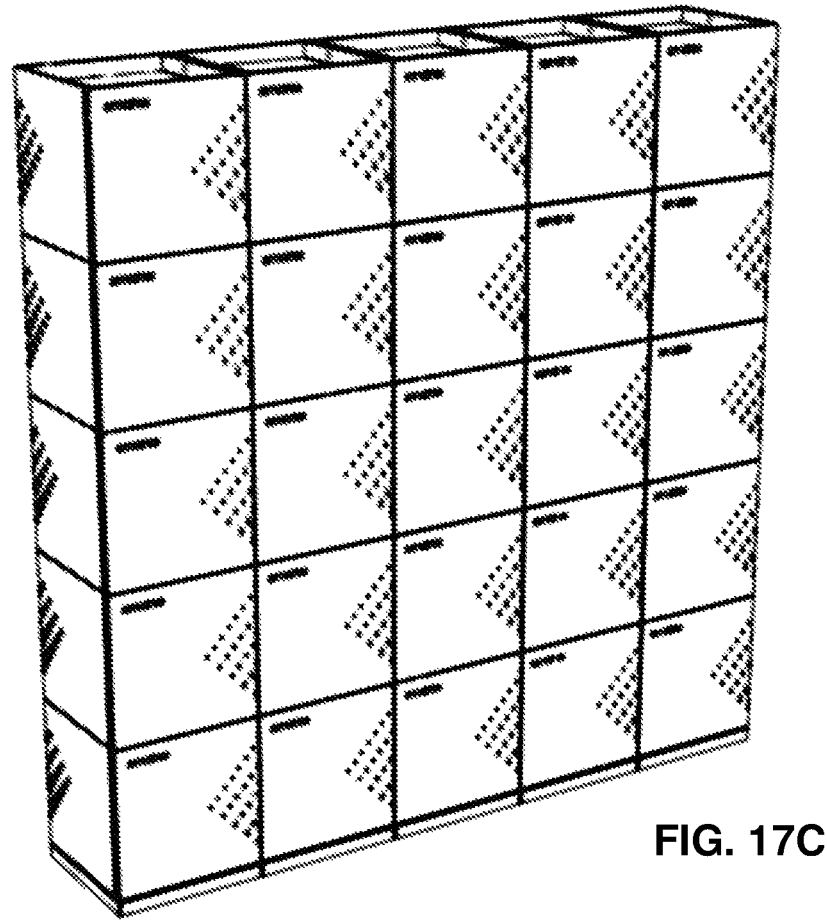
FIG. 17C shows a grid of storage units secured to bases.

As shown in FIG. 17B a storage unit could also be locked to another storage unit in the same way that a storage unit is locked to a base, as was illustrated in FIG. 17A. Furthermore, this pattern of locking storage units and bases into a system can be extended to the grid shown in FIG. 17C. This modular unitized design also allows for the addition of other design features, such as a planter in the shape of a box on top of the lockable storage units.

It should be noted that embodiments of the present invention can incorporate any combination of the above attributes in any combination and configuration capable of being understood by anyone skilled in the art.

We claim:

1. A communication device for remote unlocking wherein:
the communication device comprises an electronic circuit configured for installation inside an intercom wherein:
the intercom is part of an existing hard-wired building access system;
the existing hard-wired building access system further comprises:
a communication panel configured for placement on a periphery of a building that comprises the intercom;
a lock deactivation module that is:
proximate to the communication panel;
configured to:
release a lock in response to an electrical current passing through a coil when the electrical current is above a threshold value; and
not release the lock when the electrical current passing through the coil is below the threshold value;
a ringer that is located in the building and wired to the communication panel; and
an unlock button that is located in the intercom and wired to the coil; and
the electronic circuit is configured to be powered by the electrical current passing through the coil when the coil electrical current is below the threshold value;
the communication device further comprises:
an alternating current to direct current conversion module wherein:
the alternating current to direct current conversion module is wired in series with the coil using two electrical wires; and
the alternating current to direct current conversion module is configured for converting an alternating electrical current passing through the coil to direct current when the coil alternating electrical current is below the threshold value;
a maximum current limitation module configured for limiting the maximum electrical current drawn by the communication device;
an electrical energy storage device configured for:
storing energy harvested from the coil alternating electrical current; and
powering the communication device when the coil electrical current is insufficient for powering the communication device; and
a wireless communication circuit configured for sending and receiving information to and from the internet;
a low voltage shutoff module configured for powering down the communication device in response to a voltage value of the energy storage device below a predetermined threshold; and
a ringer signal receiving module configured for receiving a ringer signal from the communications panel;
the communication device is configured for:
sending an unlock signal to the lock deactivation module in response to:
the ringer signal; and
information received from the internet.

2. The communication device of claim 1 wherein:
the intercom comprises an intercom base and an intercom handset;
the communication device is configured for installation in an intercom component selected from the group of the intercom handset and the intercom base;
the existing hard-wired building access system lock deactivation module is configured for unlocking a door on the periphery of the building;
the lock deactivation module configured to:
release a lock in response to an alternating electrical current passing through a coil when the alternating electrical current is above a threshold value; and
not release the lock when the alternating electrical current passing through the coil is below the threshold value;
the electronic circuit is configured to be powered by the alternating electrical current passing through the coil when the coil alternating electrical current is below the threshold value;
the alternating current to direct current conversion module comprises a rectifier circuit and a capacitor;
the output of the alternating current to direct current conversion module is connected to the input of a direct current to direct current conversion module;
the maximum current limitation module is configured to:
receive the output of the direct current to direct current conversion module; and
regulate the maximum current drawn by the communication device;
the electrical storage device comprises a battery;
the ringer signal receiving module comprises an optocoupler;
the communication device further comprises a central controller and a WiFi modem wherein the central controller is configured to communicate with the WiFi modem, which, in turn, is configured to communicate with the internet; and
sending the unlock signal comprises a solid-state relay.

3. The communication device of claim 2 wherein:
the communication device is configured for installation in the intercom base;
the communication device further comprises transient voltage suppression diodes located in parallel with the input electrical wires from the coil;
the rectifier circuit comprises a full bridge rectifier circuit comprising four rectifier diodes;
the alternating current to direct current conversion module further comprises a Schottky diode;
the alternating current to direct current conversion module capacitor comprises an electrolytic capacitor;
the output voltage of the direct current to direct current conversion module is controlled by a pair of resistors in series;
the maximum current limitation module is configured to regulate the maximum current drawn by the communication device based on the resistance value of a resistor;
the low voltage shutoff module further comprises a Schmitt trigger;
the electrical storage device further comprises a supercapacitor;
the central controller is configured to receive voltage information from a voltage divider circuit connected to the maximum current limitation module;
the central controller is configured to receive status information from a voltage divider circuit connected to a status pin of the maximum current limitation module;

the communication device further comprises a cellular modem wherein the cellular modem is configured to communicate information from the central controller to a cellphone network;

the communication device further comprises a ringer signal interpretation module configured for sending an unlock signal to the lock deactivation module in response to a user input received from a call button on the communication panel; and the user input comprises a sequence of ringer signal pulses received from the communication panel wherein the ringer signal pulses comprise an unlock code.

4. The communication device of claim 1 wherein:
the communication device further comprises a ringer signal interpretation module configured for sending an unlock signal to the lock deactivation module in response to a user input received from a call button on the communication panel.

5. The communication device of claim 4 wherein:
the user input comprises a sequence of ringer signal pulses received from the communication panel wherein the ringer signal pulses comprise an unlock code.

6. The communication device of claim 1 wherein:
the electrical energy storage device comprises a capacitor.

7. The communication device of claim 1 wherein:
the communication device further comprises a central controller wherein:
  the central controller is responsive to a user-operable switch; and
  the user-operable switch can be used to set up a WiFi hotspot.

8. The communication device of claim 1 wherein:
the communication device further comprises an audio capture element and an audio interface;
the audio capture element is configured to capture audio information received from the communication panel; and
the audio interface is configured for transmitting the captured audio information to a remote phone.

9. The communication device of claim 1 wherein:
the communication device further comprises a video capture element and a video interface;
the video capture element is configured to capture video information received from the communication panel; and
the video interface is configured for transmitting the captured video information to a remote phone.

10. The communication device of claim 1 wherein:
the communication device can also be configured for installation in the communication panel located at the periphery of the building; and
when located in communication panel, the communication device can be configured for:
  receiving an unlock signal from more than one building ringer; and
    sending an unlock signal to the lock deactivation module in response to:
      identification of the ringer that was activated; and
      information received from the internet.

11. The communication device of claim 1 wherein:
the communication device is configured for communicating via WiFi to a smart speaker;
sending the unlock signal is in response to information received from the smart speaker;
the communication device is configured for communicating via Bluetooth to a mobile phone; and sending the unlock signal is in response to information received from the mobile phone.

12. The communication device of claim 1 wherein:
the lock deactivation module configured to:
  release a lock in response to an alternating electrical current passing through a coil when the alternating electrical current is above a threshold value; and
  not release the lock when the alternating electrical current passing through the coil is below the threshold value;
the electronic circuit is configured to be powered by the alternating electrical current passing through the coil when the coil alternating electrical current is below the threshold value;
the output of the alternating current to direct current conversion module is connected to the input of a direct current to direct current conversion module;
the output voltage of the direct current to direct current conversion module is controlled by a pair of resistors in series; and
the maximum current limitation module is configured to:
  receive the output of the direct current to direct current conversion module; and
  regulate the maximum current drawn by the communication device.

13. The communication device of claim 1 wherein:
the lock deactivation module configured to:
  release a lock in response to an alternating electrical current passing through a coil when the alternating electrical current is above a threshold value; and
  not release the lock when the alternating electrical current passing through the coil is below the threshold value;
the electronic circuit is configured to be powered by the alternating electrical current passing through the coil when the coil alternating electrical current is below the threshold value;
the alternating current to direct current conversion module comprises a rectifier circuit and a capacitor;
the rectifier circuit further comprises a full bridge rectifier circuit comprising four rectifier diodes; and
the alternating current to direct current conversion module further comprises a Schottky diode.

14. A system for remotely unlocking a door, wherein:
the system comprises a communication device that comprises an electronic circuit;
the communication device is configured for installation into an intercom wherein the intercom is part of a hard-wired building access system;
the hard-wired building access system further comprises a communication panel and a lock, wherein the lock:
  is configured to unlock the door;
  the lock is located proximate to the communication panel; and
  the lock is configured to be released by an electrical current passing through a coil when the electrical current is above a threshold value and to not release the lock when the electrical current passing through the coil is below the threshold value;
the intercom is configured for receiving a signal from the communication panel;
the lock is configured to be released by applying an electrical current to the coil;
the electronic circuit is powered by the coil electrical current;

the system further comprises:
- a maximum electrical current limitation module configured for limiting the maximum amount of coil electrical current drawn by the electronic circuit;
- an electrical storage device for:
  - storing energy harvested from the coil electrical current; and
  - powering the communication device when the coil electrical current is insufficient for powering the electronic circuit; and
- a wireless communication element configured for sending and receiving information from the internet; and the system is configured for sending an unlock signal to the coil in response to information received from the internet;

wherein:

the electrical current passing through the coil is an alternating electrical current; and the communication device further comprises an alternating current to direct current conversion module wherein:
- the alternating current to direct current conversion module is wired in series with the coil using two electrical wires; and
- the alternating current to direct current conversion module is configured for converting the alternating electrical current passing through the coil to direct current when the coil alternating electrical current is below the threshold value.

15. The system of claim 14 wherein:

the intercom is located in a dwelling unit;

the intercom comprises an intercom base and an intercom handset;

the communication device is configured for installation in the intercom base;

the communication panel and the lock are located on the periphery of a building that comprises the dwelling unit;

the hard-wired building access system further comprises a ringer that is located in the dwelling unit and wired to the communication panel;

the hard-wired building access system further comprises an unlock button that is located on the intercom and wired to the coil;

the communication device further comprises a low voltage shutoff module configured for powering down the communication device in response to a voltage value of the energy storage device below a predetermined threshold;

the communication device further comprises a ringer signal receiving module configured for receiving a ringer signal from the communications panel; and the system is configured for:
- receiving a ringer signal from the communication panel; and
- sending an unlock signal to the coil in response to the ringer signal and information received from the internet.

16. The system of claim 14 wherein:

the intercom is located in a dwelling unit;

the communication device is configured for installation in the handset of the intercom;

the communication panel and the lock are located on the periphery of a building that comprises the dwelling unit;

the hard-wired building access system further comprises a ringer that is located in the dwelling unit and wired to the communication panel;

the hard-wired building access system further comprises an unlock button that is located on the intercom and wired to the coil; and the communication device further comprises a low voltage shutoff module configured for powering down the communication device in response to a voltage value of the energy storage device below a predetermined threshold.

17. The system of claim 14 wherein:

the communication device further comprises a ringer signal receiving module configured for receiving a ringer signal from the communications panel; and the system is configured for:
- receiving a ringer signal from the communication panel; and
- sending an unlock signal to the coil in response to the ringer signal and information received from the internet.

18. A method for remotely unlocking a door, comprising the steps of:

- establishing a communication device that comprises an electronic circuit;
- installing the communication device into an intercom wherein the intercom is part of an existing hard-wired building access system;
- receiving a signal from a communication panel located proximate to a lock, wherein the lock is configured to be released by an electrical current passing through a coil when the electrical current is above a threshold value and to not release the lock when the electrical current passing through the coil is below the threshold value;
- powering the electronic circuit from an electrical source that also powers the coil configured for releasing the lock;
- limiting the maximum amount of coil electrical current drawn by the electronic circuit;
- storing energy harvested from the coil electrical current in a battery;
- using the battery to power the electronic circuit when the coil electrical current is insufficient;
- establishing a wireless communication element configured for sending and receiving information from the internet;
- receiving a signal from the communication panel; and
- sending an unlock signal to the coil in response to the signal from the communication panel and information received from the internet;

wherein:

the electrical current passing through the coil is an alternating electrical current; and the method further comprises the step of converting the alternating electrical coil current using a conversion module, wherein the conversion module:
- is wired in series with the coil using two electrical wires; and
- is configured for converting the alternating current passing through the coil to direct current when the coil alternating electrical current is below the threshold value.

19. The method of claim 18 wherein:

the intercom is located in a dwelling unit;

the intercom comprises an intercom base and an intercom handset;

the communication device is configured for installation in the intercom base;

the communication panel and the lock are located on the periphery of a building that comprises the dwelling unit;

the existing hard-wired building access system further comprises a ringer that is located in the dwelling unit and wired to the communication panel;

the existing hard-wired building access system further comprises an unlock button that is located on the intercom and wired to the coil.

\* \* \* \* \*